US012135512B2

(12) United States Patent
Sato et al.

(10) Patent No.: US 12,135,512 B2
(45) Date of Patent: Nov. 5, 2024

(54) IMAGE FORMING APPARATUS

(71) Applicant: BROTHER KOGYO KABUSHIKI KAISHA, Nagoya (JP)

(72) Inventors: Shougo Sato, Seto (JP); Miho Ishida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/188,409

(22) Filed: Mar. 22, 2023

(65) Prior Publication Data

US 2023/0244158 A1 Aug. 3, 2023

Related U.S. Application Data

(63) Continuation of application No. 17/865,462, filed on Jul. 15, 2022, now Pat. No. 11,635,709, which is a continuation of application No. 17/460,062, filed on Aug. 27, 2021, now Pat. No. 11,422,486.

(30) Foreign Application Priority Data

Sep. 7, 2020 (JP) ................................ 2020-149582
Sep. 7, 2020 (JP) ................................ 2020-149583

(51) Int. Cl.
*G03G 15/08* (2006.01)
*G03G 21/10* (2006.01)

(52) U.S. Cl.
CPC ..... *G03G 15/0889* (2013.01); *G03G 15/0886* (2013.01); *G03G 21/105* (2013.01)

(58) Field of Classification Search
CPC .......... G03G 15/0886; G03G 15/0889; G03G 21/105
See application file for complete search history.

(56) References Cited

U.S. PATENT DOCUMENTS

| | | | |
|---|---|---|---|
| 6,567,631 | B2 | 5/2003 | Funayama et al. |
| 7,783,234 | B2 | 8/2010 | Okamoto et al. |
| 8,768,223 | B2 | 7/2014 | Leemhuis et al. |

(Continued)

FOREIGN PATENT DOCUMENTS

| | | |
|---|---|---|
| JP | 2007-93737 A | 4/2007 |
| JP | 2008-89959 A | 4/2008 |

(Continued)

OTHER PUBLICATIONS

Japanese Office Action for the related Japanese Application No. 2020-149583 dated Jun. 4, 2024.

*Primary Examiner* — Hoang X Ngo
(74) *Attorney, Agent, or Firm* — KENEALY VAIDYA LLP

(57) ABSTRACT

In an image forming apparatus, a drum cartridge includes a photosensitive drum, a developing device, a drum cleaner, a waste toner tube, and a flange. The waste toner tube includes a first end portion communicating with the drum cleaner and a second end portion connected to the flange. The developing device includes a protruding portion facing the flange. The cushion member is located between the flange and the protruding portion. The cushion member allows a cartridge mounting part of the developing device to move with respect to the flange in a case where the developing device moves with respect to the photosensitive drum.

12 Claims, 13 Drawing Sheets

(56) References Cited

U.S. PATENT DOCUMENTS

| | | | | |
|---|---|---|---|---|
| 9,383,716 | B2 | 7/2016 | Lee et al. | |
| 9,703,234 | B1 | 7/2017 | Bejat et al. | |
| 2007/0077099 | A1 | 4/2007 | Ota | |
| 2008/0247784 | A1 | 10/2008 | Kakuta et al. | |
| 2009/0035014 | A1 | 2/2009 | Sato | |
| 2011/0076056 | A1* | 3/2011 | Sato | G03G 15/0868 399/120 |
| 2012/0251160 | A1 | 10/2012 | Sato | |
| 2017/0031267 | A1 | 2/2017 | Matsuda et al. | |
| 2017/0176887 | A1 | 6/2017 | Bejat et al. | |
| 2017/0285566 | A1 | 10/2017 | Shimizu et al. | |
| 2018/0267459 | A1 | 9/2018 | Sato et al. | |
| 2018/0373197 | A1 | 12/2018 | Sato et al. | |
| 2019/0361384 | A1 | 11/2019 | Sato et al. | |

FOREIGN PATENT DOCUMENTS

| | | | |
|---|---|---|---|
| JP | 2008-170951 | A | 7/2008 |
| JP | 2009-36921 | A | 2/2009 |
| JP | 2012-215598 | A | 11/2012 |
| JP | 2017-32736 | A | 2/2017 |
| JP | 2018-155959 | A | 10/2018 |
| JP | 2019-8064 | A | 1/2019 |
| JP | 2019-120856 | A | 7/2019 |
| JP | 2019-204005 | A | 11/2019 |
| JP | 2020-118986 | A | 8/2020 |

* cited by examiner

IMAGE FORMING APPARATUS

CROSS-REFERENCE TO RELATED APPLICATIONS

This application is a continuation application claiming priority benefit under 35 U.S.C. 120 of U.S. patent application Ser. No. 17/865,462 filed on Jul. 15, 2022 which was a continuation and claims priority benefit to U.S. patent application Ser. No. 17/460,062 filed on Aug. 27, 2021 now U.S. Pat. No. 11,422,486 issued on Aug. 23, 2022 and which are based upon and claims the benefit of priority under 35 U.S.C. 119 from prior Japanese patent application No. 2020-149582, filed on Sep. 7, 2020, and Japanese patent application No. 2020-149583, filed on Sep. 7, 2020, the entire contents of all of which are incorporated herein by reference.

TECHNICAL FIELD

The present disclosure relates to an image forming apparatus.

BACKGROUND

One image forming apparatus of related art includes a main body housing, and a process cartridge. The process cartridge includes a photosensitive drum, and a developing device. The developing device includes a developing housing and a developing roller. The developing housing includes a developing chamber in which the developing roller is arranged and a toner accommodation chamber in which toner is accommodated.

Another image forming apparatus of related art includes a main body housing, a process cartridge and a transfer device. The process cartridge includes a photosensitive drum, and a developing device. The transfer device is located above the photosensitive drum in a state where the process cartridge is mounted to the main body housing. The developing device includes a developing housing, a developing roller and an agitator. The developing housing includes a developing chamber in which the developing roller is arranged and a toner accommodation chamber in which toner is accommodated. In the state where the process cartridge is mounted to the main body housing, the toner accommodation chamber is located below the developing chamber. The agitator is located in the toner accommodation chamber and is configured to convey the toner from the toner accommodation chamber toward the developing chamber.

SUMMARY

In the above-described one image forming apparatus, when a remaining amount of toner in the toner accommodation chamber becomes small, the entire process cartridge including the photosensitive drum needs to be replaced even though it is not necessary to replace the photosensitive drum. In such image forming apparatus, it is difficult to reduce the use cost.

It is therefore considered to separate the process cartridge into a toner cartridge in which toner is accommodated and a drum cartridge including the photosensitive drum and the developing device, and to individually replace the toner cartridge and the drum cartridge.

It is also desired to provide the drum cartridge with a drum cleaner and to remove waste toner from a circumferential surface of the photosensitive drum. The waste toner removed from the circumferential surface of the photosensitive drum is conveyed and accommodated in a waste toner accommodation part through a waste toner tube from the drum cleaner. The waste toner accommodation part is replaced at an arbitrary timing.

It is therefore desired to provide the waste toner accommodation part to the toner cartridge, and to replace the waste toner accommodation part upon replacement of the toner cartridge.

It is also considered to configure the developing device having the developing roller to be movable with respect to the photosensitive drum, so as to suppress variation in a contact state of the developing roller with the photosensitive drum. The toner cartridge is mounted to the developing device because it is necessary to supply toner to the developing roller.

In a case where the toner cartridge has the waste toner accommodation part, when the developing device moves in a state where the toner cartridge is mounted to the developing device, a position of the waste toner accommodation part with respect to the waste toner tube varies, so that the waste toner, which is conveyed from the drum cleaner to the waste toner accommodation part, may leak.

Accordingly, an aspect of the present disclosure provides an image forming apparatus capable of suppressing leakage of waste toner, which is conveyed from a drum cleaner to a waste toner accommodation part, in a configuration where a toner cartridge having the waste toner accommodation part is mounted to a developing device movable with respect to a photosensitive drum.

Further, in the above-described another image forming apparatus, when a remaining amount of toner in the toner accommodation chamber becomes small, the entire process cartridge including the photosensitive drum needs to be replaced, even though it is not necessary to replace the photosensitive drum. In such image forming apparatus, it is difficult to reduce the use cost.

Accordingly, another aspect of the present disclosure provides an image forming apparatus in which a toner cartridge and a drum cartridge are capable of being replaced individually, in a configuration where a transfer device is located above a photosensitive drum in a state where the drum cartridge is mounted to a main body housing.

According to an aspect of the present disclosure, there is provided an image forming apparatus including a main body housing, a drum cartridge, a toner cartridge, and a cushion member.

The drum cartridge is capable of being mounted to the main body housing. The drum cartridge includes a photosensitive drum and a developing device. The photosensitive drum is rotatable about a drum axis extending in a first direction. The developing device is configured to supply toner to the photosensitive drum and is movable with respect to the photosensitive drum in a direction intersecting with the first direction.

The toner cartridge is capable of being mounted to the developing device. The toner cartridge is capable of supplying the toner to the developing device in a state where the toner cartridge is mounted to the developing device.

The drum cartridge includes a first side frame, a second side frame, a drum cleaner, a waste toner tube, and a flange. The first side frame supports one end portion of the photosensitive drum in the first direction. The second side frame supports another end portion of the photosensitive drum in the first direction. The drum cleaner is configured to clean a circumferential surface of the photosensitive drum. The waste toner tube is located on an opposite side to the second side frame with respect to the first side frame. The waste toner tube is configured to allow waste toner from the drum cleaner to pass therethrough. The waste toner tube includes a first end portion communicating with the drum cleaner and a second end portion located apart from the first end portion. The flange extends from the first side frame. The second end portion of the waste toner tube is connected to the flange.

The developing device includes a developing roller and a developing housing. The developing roller is rotatable about a developing axis extending in the first direction. The developing housing includes a developing part supporting the developing roller and a cartridge mounting part to which the toner cartridge is capable of being mounted.

The developing part includes a first sidewall and a second sidewall. The first sidewall supports one end portion of the developing roller in the first direction. The second sidewall supports another end portion of the developing roller in the first direction.

The cartridge mounting part includes a protruding portion protruding toward an opposite side to the second sidewall with respect to the first sidewall in the first direction. The protruding portion faces the flange. The protruding portion has a waste toner discharge port communicating with an internal space of the second end portion and capable of discharging the waste toner having passed through the waste toner tube.

The toner cartridge includes a toner accommodation part and a waste toner accommodation part. The toner accommodation part is configured to accommodate the toner that is supplied to the developing part. The waste toner accommodation part is configured to accommodate the waste toner. The waste toner accommodation part has a waste toner acceptance port communicating with the waste toner discharge port in a state where the toner cartridge is mounted to the cartridge mounting part.

The cushion member is located between the flange and the protruding portion. The cushion member allows the cartridge mounting part to move with respect to the flange in a case where the developing device moves with respect to the photosensitive drum in a state where the drum cartridge is mounted in the main body housing.

According to such configuration, the toner cartridge accommodating the toner and the drum cartridge including the photosensitive drum can be replaced individually.

Further, in the state where the toner cartridge is mounted to the cartridge mounting part of the drum cartridge, the waste toner removed from the circumferential surface of the photosensitive drum by the drum cleaner is accommodated in the waste toner accommodation part of the toner cartridge through the waste toner tube and the waste toner acceptance port. The waste toner accommodation part is replaced together with the toner accommodation part by replacement of the toner cartridge. For this reason, the waste toner accommodation part can stably accommodate the waste toner without increasing the capacity thereof.

Further, the cushion member is located between the flange to which the second end portion of the waste toner tube is connected and the protruding portion of the cartridge mounting part.

For this reason, in the state where the toner cartridge is mounted to the cartridge mounting part and the drum cartridge is mounted to the main body housing, in a case where the developing device moves with respect to the photosensitive drum, the cartridge mounting part is capable of moving with respect to the flange, and the leakage of the waste toner from between the flange and the protruding portion can be suppressed.

According to another aspect of the present disclosure, there is provided an image forming apparatus including a main body housing, a drum cartridge, a toner cartridge, and a transfer device.

The drum cartridge is capable of being mounted to the main body housing. The drum cartridge includes a photosensitive drum and a developing device. The photosensitive drum is rotatable about an axis extending in a first direction. The developing device includes a developing roller and a developing housing supporting the developing roller.

The toner cartridge is capable of accommodating toner that is supplied to the developing housing. The toner cartridge is capable of being mounted to the drum cartridge.

The transfer device is located above the photosensitive drum in a state where the drum cartridge is mounted to the main body housing. The drum cartridge is configured to transfer the toner on the photosensitive drum to a sheet.

The developing housing include a first developing part, a second developing part, and a wall. The first developing part supports the developing roller. The second developing part is located above the toner cartridge in a state where the toner cartridge is mounted to the drum cartridge. The second developing part is located on an opposite side to the photosensitive drum with respect to the first developing part. The second developing part has a toner acceptance port. The second developing part communicates with the first developing part. The wall is located between the first developing part and the second developing part. The wall has a first opening communicating with the first developing part and the second developing part.

The developing device further includes a developing shutter configured to be movable between a developing close position in which the toner acceptance port is closed and a developing open position in which the toner acceptance port is opened.

The toner cartridge includes a cartridge housing, a toner shutter, and a rotatable agitator. The cartridge housing is capable of accommodating the toner. The cartridge housing has a toner discharge port. The toner shutter is configured to be movable between a toner close position in which the toner discharge port is closed and a toner open position in which the toner discharge port is opened. The agitator is located in the cartridge housing. The agitator includes a shaft and a blade. The blade is rotatable together with the shaft. The blade has a first end fixed to the shaft and a second end located apart from the first end.

In a state where the toner cartridge is mounted to the drum cartridge, the developing shutter is located in the developing open position, and the toner shutter is located in the toner open position, the toner discharge port communicates with the toner acceptance port.

In the state where the toner cartridge is mounted to the drum cartridge, the developing shutter is located in the developing open position, and the toner shutter is located in the toner open position, in a case where the agitator rotates, the second end of the blade reaches a height of the first opening in a vertical direction.

According to such configuration, in the state where the toner cartridge is mounted to the drum cartridge and the drum cartridge is mounted to the main body housing, even when the cartridge housing of the toner cartridge is located below the second developing part, the agitator can stably supply the toner from the cartridge housing to the first developing part through the second developing part and the first opening.

Further, in the state where the developing shutter is located in the developing close position and the toner shutter is located in the toner close position, when the toner cartridge is demounted from the drum cartridge, the toner can be suppressed from leaking from the toner cartridge and the drum cartridge.

As a result, the drum cartridge and the toner cartridge can be replaced individually and smoothly, in a configuration where the transfer device is located above the photosensitive drum in a state where the drum cartridge is mounted to the main body housing.

DESCRIPTION OF EMBODIMENTS

1. Image Forming Apparatus 1

An image forming apparatus 1 is described with reference to FIGS. 1 and 2.

Figure 1:
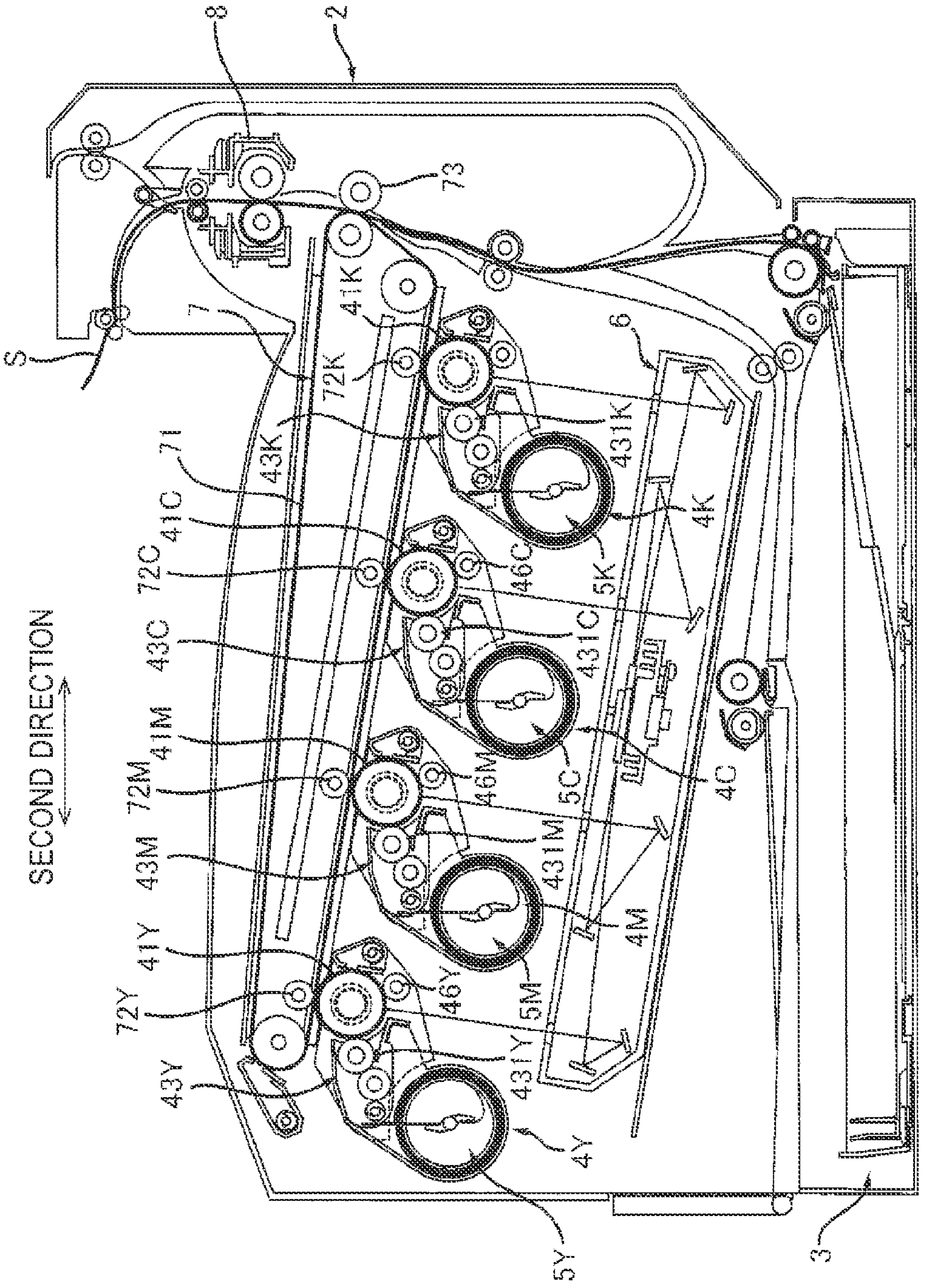
FIG. 1 is a schematic configuration view of an image forming apparatus.

As shown in FIG. 1, the image forming apparatus 1 includes a main body housing 2, a sheet cassette 3, four drum cartridges 4Y, 4M, 4C and 4K, four toner cartridges 5Y, 5M, 5C and 5K, an exposure device 6, a transfer device 7, and a fixing device 8.

1.1 Main Body Housing 2

The main body housing 2 is configured to accommodate the sheet cassette 3, the four drum cartridges 4Y, 4M, 4C and 4K, the four toner cartridges 5Y, 5M, 5C and 5K, the exposure device 6, the transfer device 7, and the fixing device 8.

1.2 Sheet Cassette 3

The sheet cassette 3 is capable of accommodating sheets S. The sheets S in the sheet cassette 3 are each conveyed toward a secondary transfer roller 73. The secondary transfer roller 73 will be described later.

1.3 Four Drum Cartridges 4Y, 4M, 4C and 4K

The four drum cartridges 4Y, 4M, 4C and 4K can be mounted to the main body housing 2. Specifically, the four drum cartridges 4Y, 4M, 4C and 4K can be each mounted to and demounted from the main body housing 2 along a first direction. The first direction is an extension direction of a drum axis 411 of a photosensitive drum 41K. The photosensitive drum 41K will be described later. In a state where the four drum cartridges 4Y, 4M, 4C and 4K are mounted to the main body housing 2, the four drum cartridges 4Y, 4M, 4C and 4K are located apart from each other by predetermined intervals in a second direction. The second direction intersects with the first direction.

The four drum cartridges 4Y, 4M, 4C and 4K have the same configuration. For this reason, in the below, the drum cartridge 4K will be described in detail, and the descriptions of the drum cartridges 4Y, 4M and 4C will be omitted.

1.3.1 Drum Cartridge 4K

Figure 2:
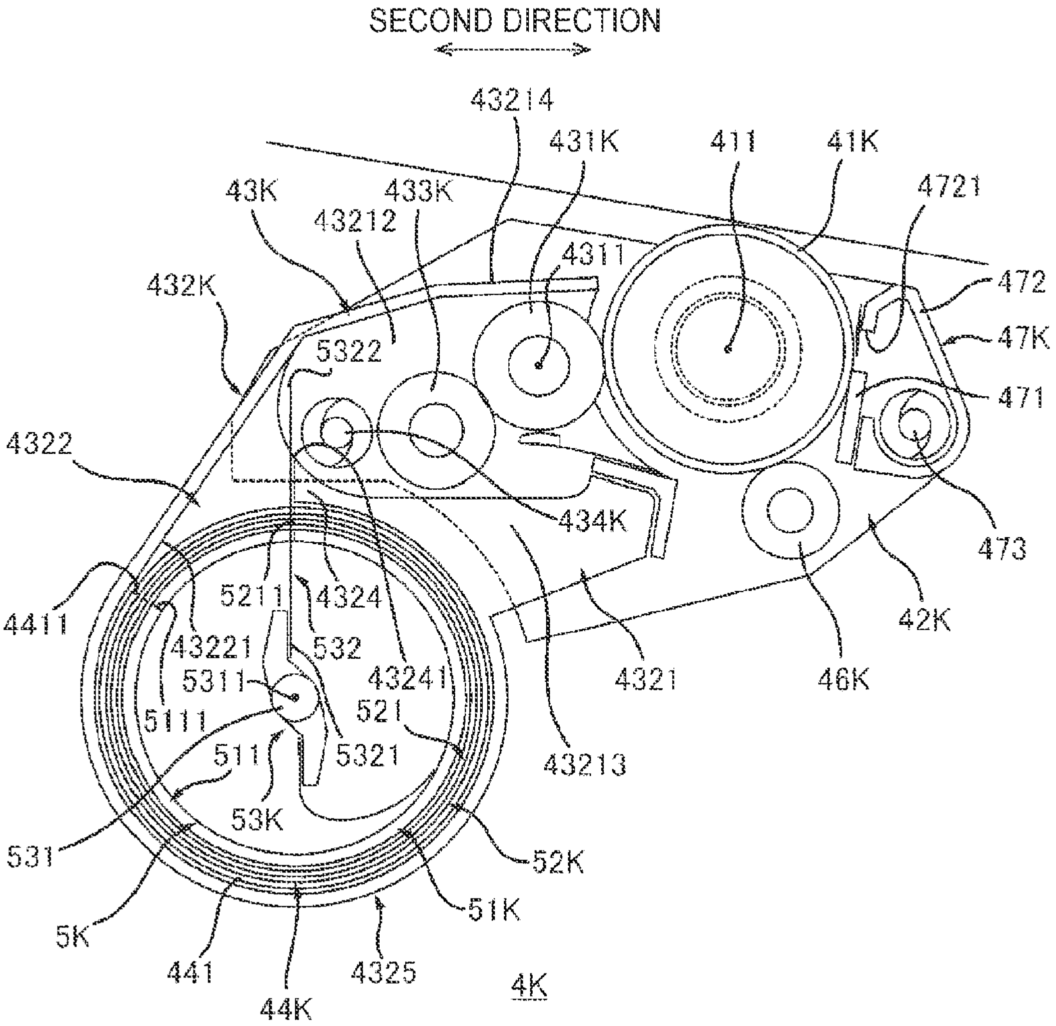
FIG. 2 is an enlarged view of a drum cartridge shown in FIG. 1, showing a state where a toner cartridge is mounted to the drum cartridge, a developing shutter is located in a developing open position and a toner shutter is located in a toner open position.

As shown in FIG. 2, the drum cartridge 4K includes a photosensitive drum 41K, a charging device 46K, and a developing device 43K.

The photosensitive drum 41K extends in the first direction. The photosensitive drum 41K has a cylindrical shape. The photosensitive drum 41K is capable of rotating about a drum axis 411. The drum axis 411 extends in the first direction.

The charging device 46K is configured to charge a circumferential surface of the photosensitive drum 41K. The charging device 46K is, specifically, a charging roller. Note that, the charging device 46K may also be a scorotron-type charger.

The developing device 43K is capable of supplying toner to the photosensitive drum 41K. The developing device 43K has a developing roller 431K.

The developing roller 431K is capable of supplying toner to the photosensitive drum 41K. The developing roller 431K extends in the first direction. The developing roller 431K is capable of rotating about a developing axis 4311. The developing axis 4311 extends in the first direction. In the present embodiment, the developing roller 431K is in contact with the photosensitive drum 41K. The developing roller 431K may also be located apart from the photosensitive drum 41K by a predetermined interval.

1.3.2 Drum Cartridges 4Y, 4M and 4C

As shown in FIG. 1, the drum cartridge 4Y includes a photosensitive drum 41Y, a charging device 46Y, and a developing device 43Y The developing device 43Y includes a developing roller 431Y The drum cartridge 4M includes a photosensitive drum 41M, a charging device 46M, and a developing device 43M. The developing device 43M includes a developing roller 431M. The drum cartridge 4C includes a photosensitive drum 41C, a charging device 46C, and a developing device 43C. The developing device 43C includes a developing roller 431C.

1.4 Four Toner Cartridges 5Y, 5M, 5C and 5K

The toner cartridge 5Y can be mounted to the developing device 43Y of the drum cartridge 4Y The toner cartridge 5Y is capable of accommodating toner that is supplied to the developing device 43Y The toner cartridge 5M is capable of being mounted to the developing device 43M of the drum cartridge 4M. The toner cartridge 5M is capable of accommodating toner that is supplied to the developing device 43M. The toner cartridge 5C is capable of being mounted to the developing device 43C of the drum cartridge 4C. The toner cartridge 5C is capable of accommodating toner that is supplied to the developing device 43C. The toner cartridge 5K is capable of being mounted to the developing device 43K of the drum cartridge 4K. The toner cartridge 5K is capable of accommodating toner that is supplied to the developing device 43K.

1.5 Exposure Device 6

The exposure device 6 is capable of exposing surfaces of the four photosensitive drums 41Y, 41M, 41C and 41K. The exposure device 6 is configured to emit light for exposing the charged surfaces of the photosensitive drums 41Y, 41M, 41C and 41K. Thereby, an electrostatic latent image is formed on each of the surfaces of the photosensitive drums 41Y, 41M, 41C and 41K. The toner is supplied to the electrostatic latent images.

In a state where the four drum cartridges 4Y, 4M, 4C and 4K are mounted to the main body housing 2, the exposure device 6 is located below the four drum cartridges 4Y, 4M, 4C and 4K. Note that, as used herein, "below" means "below" in a vertical direction when the image forming apparatus 1 is placed in a normal use state.

The exposure device 6 is, specifically, a laser scan unit. Note that, the exposure device 6 may also be an LED array.

1.6 Transfer Device 7

The transfer device 7 is configured to transfer the toners on the four photosensitive drums 41Y, 41M, 41C and 41K to a sheet. In a state where the four drum cartridges 4Y, 4M, 4C and 4K are mounted to the main body housing 2, the transfer device 7 is located on an opposite side to the exposure device 6 with respect to the four drum cartridges 4Y, 4M, 4C and 4K. In the state where the four drum cartridges 4Y, 4M, 4C and 4K are mounted to the main body housing 2, the transfer device 7 is located above the four photosensitive drums 41Y, 41M, 41C and 41K. The transfer device 7 includes an intermediate transfer belt 71, four primary transfer rollers 72Y, 72M, 72C and 72K, and a secondary transfer roller 73.

In the state where the four drum cartridges 4Y, 4M, 4C and 4K are mounted to the main body housing 2, the four photosensitive drums 41Y, 41M, 41C and 41K are in contact with the intermediate transfer belt 71. In the state where the four drum cartridges 4Y, 4M, 4C and 4K are mounted to the main body housing 2, the intermediate transfer belt 71 passes between the photosensitive drum 41Y and the primary transfer roller 72Y, between the photosensitive drum 41M and the primary transfer roller 72M, between the photosensitive drum 41C and the primary transfer roller 72C, and between the photosensitive drum 41K and the primary transfer roller 72K.

The primary transfer roller 72Y is configured to transfer the toner on the photosensitive drum 41Y to the intermediate transfer belt 71. The primary transfer roller 72M is configured to transfer the toner on the photosensitive drum 41M to the intermediate transfer belt 71. The primary transfer roller 72C is configured to transfer the toner on the photosensitive drum 41C to the intermediate transfer belt 71. The primary transfer roller 72K is configured to transfer the toner on the photosensitive drum 41K to the intermediate transfer belt 71.

The secondary transfer roller 73 is arranged side by side with the intermediate transfer belt 71 in the second direction. The secondary transfer roller 73 is in contact with the intermediate transfer belt 71. The sheet S that is conveyed from the sheet cassette 3 passes between the intermediate transfer belt 71 and the secondary transfer roller 73. At this time, the secondary transfer roller 73 is configured to transfer the toner transferred to the intermediate transfer belt 71 onto the sheet S.

1.7 Fixing Device 8

The fixing device 8 is configured to fix the toner on the sheet S by heating and pressurizing the sheet S having the toner transferred thereon. The sheet having passed through the fixing device 8 is discharged to an upper surface of the main body housing 2.

2. Details of Drum Cartridge 4K

Subsequently, the drum cartridge 4K is described in detail with reference to FIGS. 2 to 11.

As shown in FIG. 2, the drum cartridge 4K includes a drum frame 42K, a drum cleaner 47K, a waste toner tube 49K (see FIG. 4), a waste toner conveying member 48K (see FIG. 5), and a cushion member 9K (see FIG. 5), in addition to the photosensitive drum 41K, the charging device 46K, and the developing device 43K. In other words, the image forming apparatus 1 includes the cushion member 9K.

2.1 Drum Frame 42K

Figure 4:
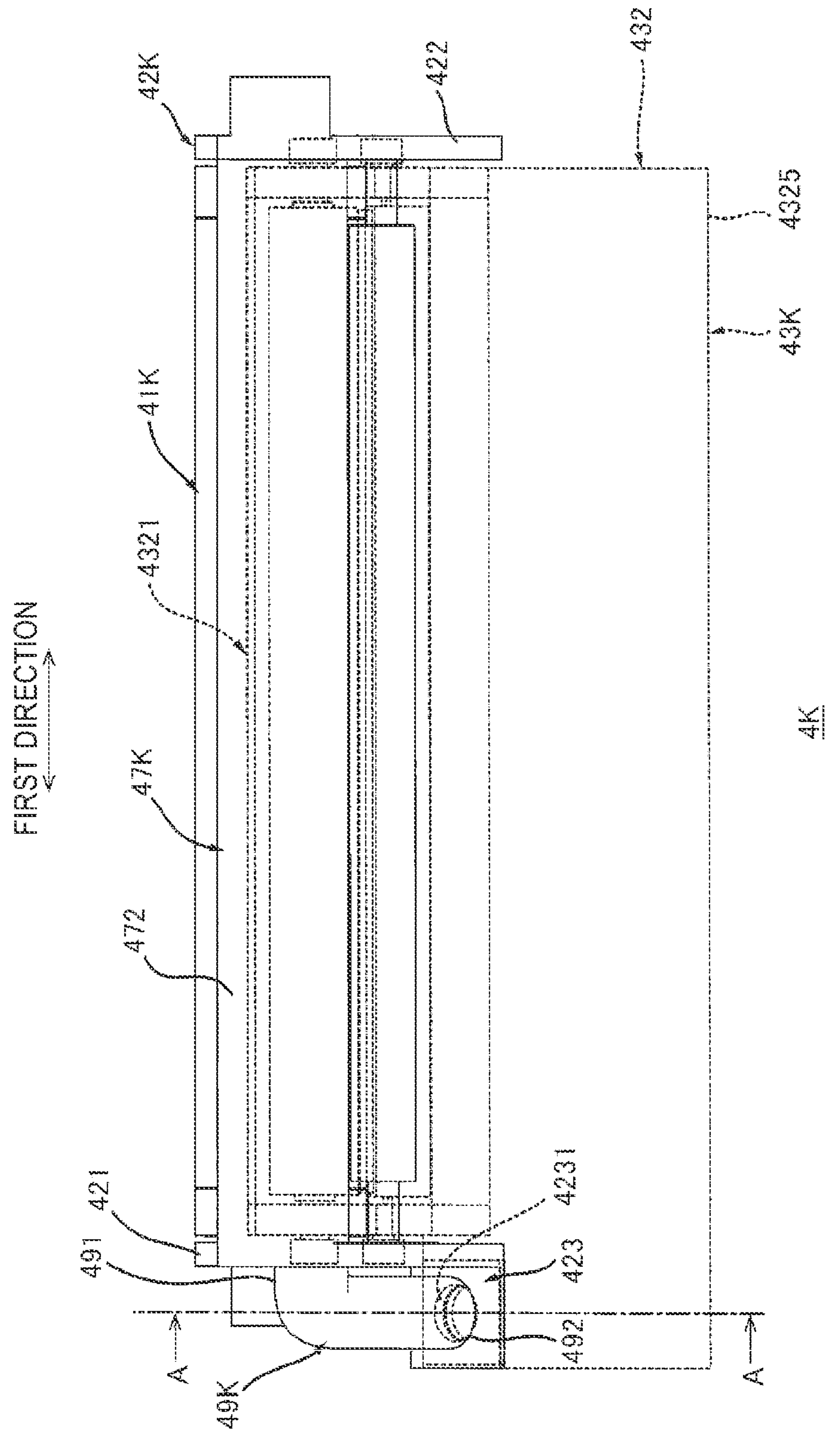
FIG. 4 is a front view of the drum cartridge shown in FIG. 2.

The drum frame 42K supports the photosensitive drum 41K, the charging device 46K, the developing device 43K, the drum cleaner 47K, and the waste toner tube 49K. As shown in FIG. 4, the drum frame 42K includes a first side frame 421, a second side frame 422, and a flange 423. In other words, the drum cartridge 4K includes the first side frame 421, the second side frame 422, and the flange 423.

2.1.1 First Side Frame 421 and Second Side Frame 422

The first side frame 421 supports one end portion of the photosensitive drum 41K in the first direction. The second side frame 422 is apart from the first side frame 421 in the first direction. The second side frame 422 supports another end portion of the photosensitive drum 41K in the first direction.

Figure 5:
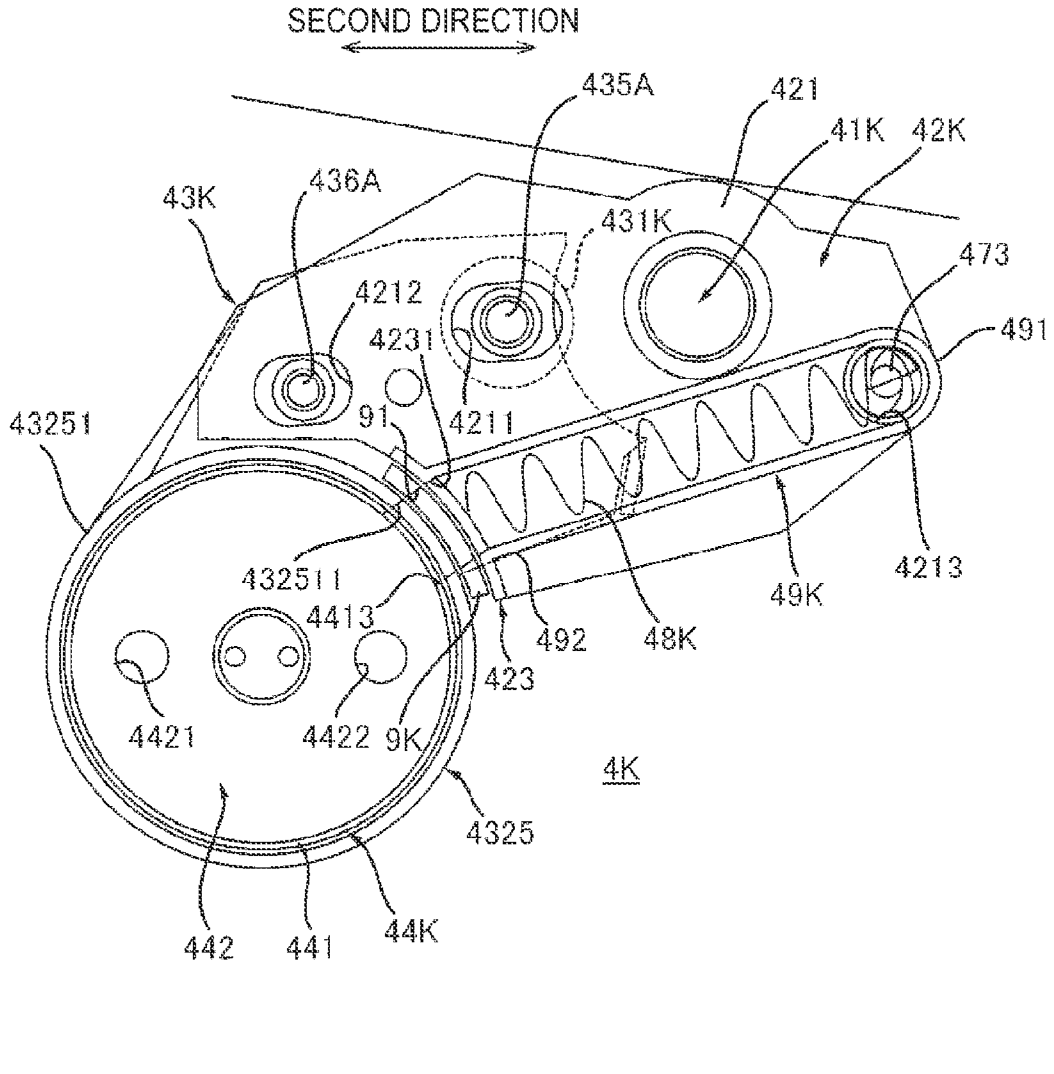
FIG. 5 is an A-A sectional view of the drum cartridge shown in FIG. 4.

As shown in FIG. 5, the first side frame 421 extends in the second direction. The first side frame 421 has a first long hole 4211, a second long hole 4212, and a hole 4213.

The first long hole 4211 is located at a center of the first side frame 421 in the second direction. The first long hole 4211 extends in a direction in which the photosensitive drum 41K and the developing roller 431K face each other. In the first long hole 4211, a first developing protrusion 435A of the developing device 43K is fitted. The first developing protrusion 435A will be described later.

The second long hole 4212 is located on an opposite side to the photosensitive drum 41K with respect to the first long hole 4211 in the second direction. An extension direction of the second long hole 4212 is parallel to an extension direction of the first long hole 4211. In the second long hole 4212, a second developing protrusion 436A of the developing device 43K is fitted. The second developing protrusion 436A will be described later.

The hole 4213 is located on an opposite side to the first long hole 4211 with respect to the photosensitive drum 41K in the second direction. The hole 4213 communicates with an internal space of a cleaner housing 472 of the drum cleaner 47K. The cleaner housing 472 will be described later.

As shown in FIG. 4, the second side frame 422 is similar to the first side frame 421, except that the hole 4213 is not provided. For this reason, the description of the second side frame 422 is omitted.

2.1.2 Flange 423

The flange 423 is located on an opposite side to the second side frame 422 with respect to the first side frame 421 in the first direction. The flange 423 extends from the first side frame 421 in the first direction. As shown in FIG. 5, the flange 423 is located apart from the hole 4213 in the second direction. The flange 423 has a hole 4231.

2.2 Drum Cleaner 47K

As shown in FIG. 2, the drum cleaner 47K is configured to clean the circumferential surface of the photosensitive drum 41K. The drum cleaner 47K is located between the first side frame 421 and the second side frame 422 in the first direction (see FIG. 4). The drum cleaner 47K is located on an opposite side to the developing roller 431K with respect to the photosensitive drum 41K. The drum cleaner 47K includes a cleaning blade 471, a cleaner housing 472, and a screw auger 473.

An edge of the cleaning blade 471 is in contact with the surface of the photosensitive drum 41K. When the photosensitive drum 41K rotates, the cleaning blade 471 scrapes off toner remaining on the surface of the photosensitive drum 41K from the surface of the photosensitive drum 41K, as waste toner.

The cleaner housing 472 is configured to accommodate the waste toner. The cleaner housing 472 supports the cleaning blade 471. The cleaner housing 472 has an opening 4721. The opening 4721 accepts the waste toner scraped by the cleaning blade 471. The cleaner housing 472 extends in the first direction. One end of the cleaner housing 472 in the first direction is connected to the first side frame 421 (see FIG. 4). Another end of the cleaner housing 472 in the first direction is connected to the second side frame 422 (see FIG. 4). An internal space of the cleaner housing 472 communicates with the hole 4213 of the first side frame 421 (see FIG. 5).

The screw auger 473 is located in the cleaner housing 472. The screw auger 473 extends in the first direction. The screw auger 473 is configured to convey the waste toner in the cleaner housing 472 toward the hole 4213 in the first direction.

2.3 Waste Toner Tube 49K

As shown in FIGS. 4 and 5, the waste toner tube 49K is configured to allow the waste toner from the drum cleaner 47K to pass therethrough. The waste toner tube 49K is located on an opposite side to the second side frame 422 with respect to the first side frame 421. The waste toner tube 49K has a first end portion 491 and a second end portion 492. The first end portion 491 of the waste toner tube 49K is connected to the first side frame 421. An internal space of the first end portion 491 communicates with the hole 4213 of the first side frame 421. Thereby, the first end portion 491 of the waste toner tube 49K communicates with the cleaner housing 472 of the drum cleaner 47K. The second end portion 492 of the waste toner tube 49K is located apart from the first end portion 491. The second end portion 492 is connected to the flange 423. An internal space of the second end portion 492 communicates with the hole 4231 of the flange 423.

As shown in FIG. 5, in a state where the drum cartridge 4K is mounted to the main body housing 2, the second end portion 492 of the waste toner tube 49K is located below the first end portion 491 of the waste toner tube 49K. In the state where the drum cartridge 4K is mounted to the main body housing 2, the waste toner tube 49K is inclined downward from the first end portion 491 toward the second end portion 492. Thereby, the waste toner can be sent from the first end portion 491 toward the second end portion 492 by using the gravity.

2.4 Waste Toner Conveying Member 48K

The waste toner conveying member 48K is configured to convey the waste toner. Specifically, the waste toner conveying member 48K is configured to convey the waste toner in the waste toner tube 49K from the first end portion 491 toward the second end portion 492. The waste toner conveying member 48K is located in the waste toner tube 49K. The waste toner conveying member 48K has flexibility. The waste toner conveying member 48K is a spring auger.

2.5 Developing Device 43K

As shown in FIG. 2, the developing device 43K includes a developing housing 432K, a supply roller 433K, a toner conveying member 434K, a developing shutter 44K, two first developing protrusions 435A and 435B (see FIG. 6), and two second developing protrusions 436A and 436B (see FIG. 6), in addition to the developing roller 431K.

2.5.1 Developing Housing 432K

The developing housing 432K has a first developing part 4321, a wall 4324, a second developing part 4322, and a cartridge mounting part 4325.

2.5.1.1 First Developing Part 4321

The first developing part 4321 of the developing housing 432K supports the developing roller 431K. The first developing part 4321 is configured to accommodate the developing roller 431K, the supply roller 433K, and the toner conveying member 434K.

Figure 6:
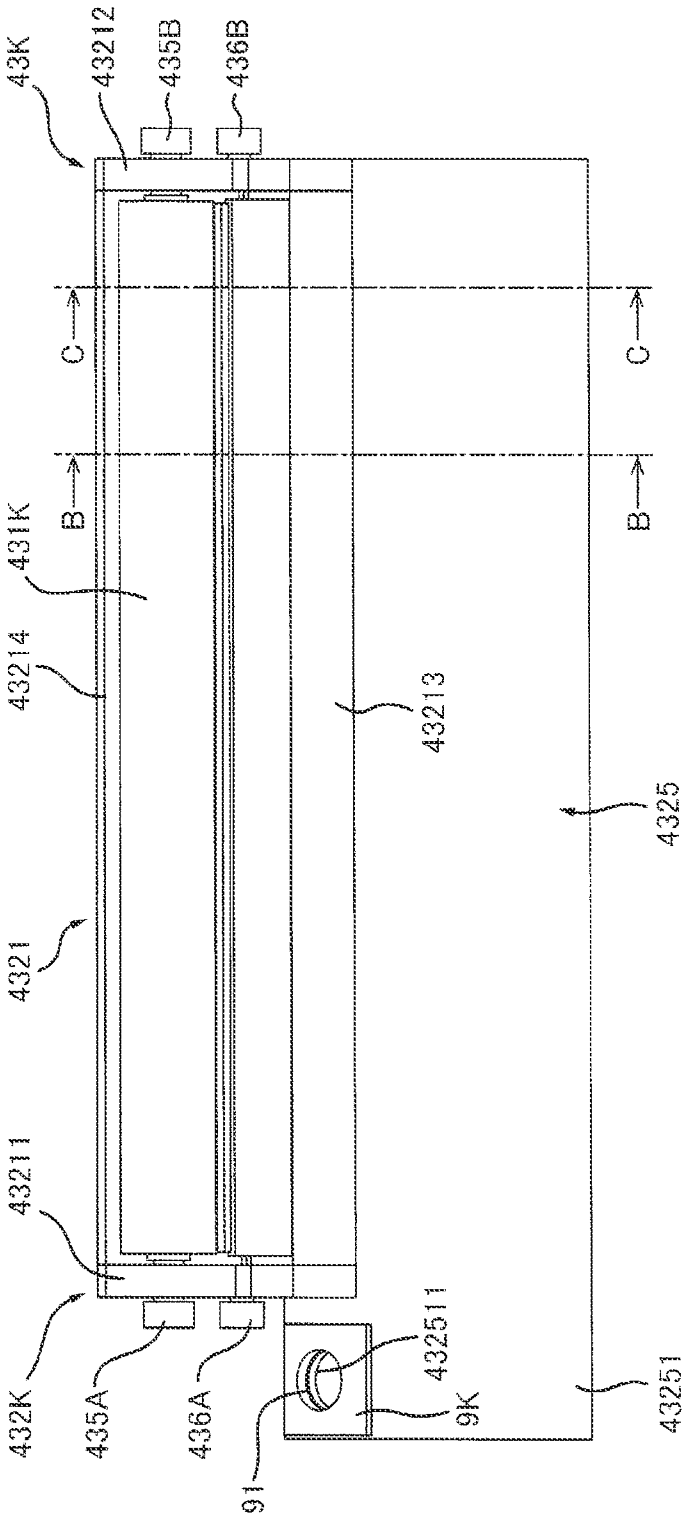
FIG. 6 is a front view of a developing device shown in FIG. 5.

As shown in FIGS. 2 and 6, the first developing part 4321 has a first sidewall 43211, a second sidewall 43212, a bottom wall 43213, and an upper wall 43214.

As shown in FIG. 6, the first sidewall 43211 supports one end portion of the developing roller 431K in the first direction. The second sidewall 43212 is apart from the first sidewall 43211 in the first direction. The second sidewall 43212 supports another end portion of the developing roller 431K in the first direction.

In the state where the drum cartridge 4K is mounted to the main body housing 2, the bottom wall 43213 is located below the developing roller 431K. The bottom wall 43213 is located between the first sidewall 43211 and the second sidewall 43212 in the first direction. One end portion of the bottom wall 43213 in the first direction is connected to the first sidewall 43211. Another end portion of the bottom wall 43213 in the first direction is connected to the second sidewall 43212.

The upper wall 43214 is located on an opposite side to the bottom wall 43213 with respect to the developing roller 431K. The upper wall 43214 is located between the first sidewall 43211 and the second sidewall 43212 in the first direction. One end portion of the upper wall 43214 in the first direction is connected to the first sidewall 43211. Another end portion of the upper wall 43214 in the first direction is connected to the second sidewall 43212.

As shown in FIG. 2, the wall 4324 is located on an opposite side to the photosensitive drum 41K with respect to the first developing part 4321. The wall 4324 extends in the first direction. One end portion of the wall 4324 in the first direction is connected to the first sidewall 43211. Another end portion of the wall 4324 in the first direction is connected to the second sidewall 43212.

Figure 7:
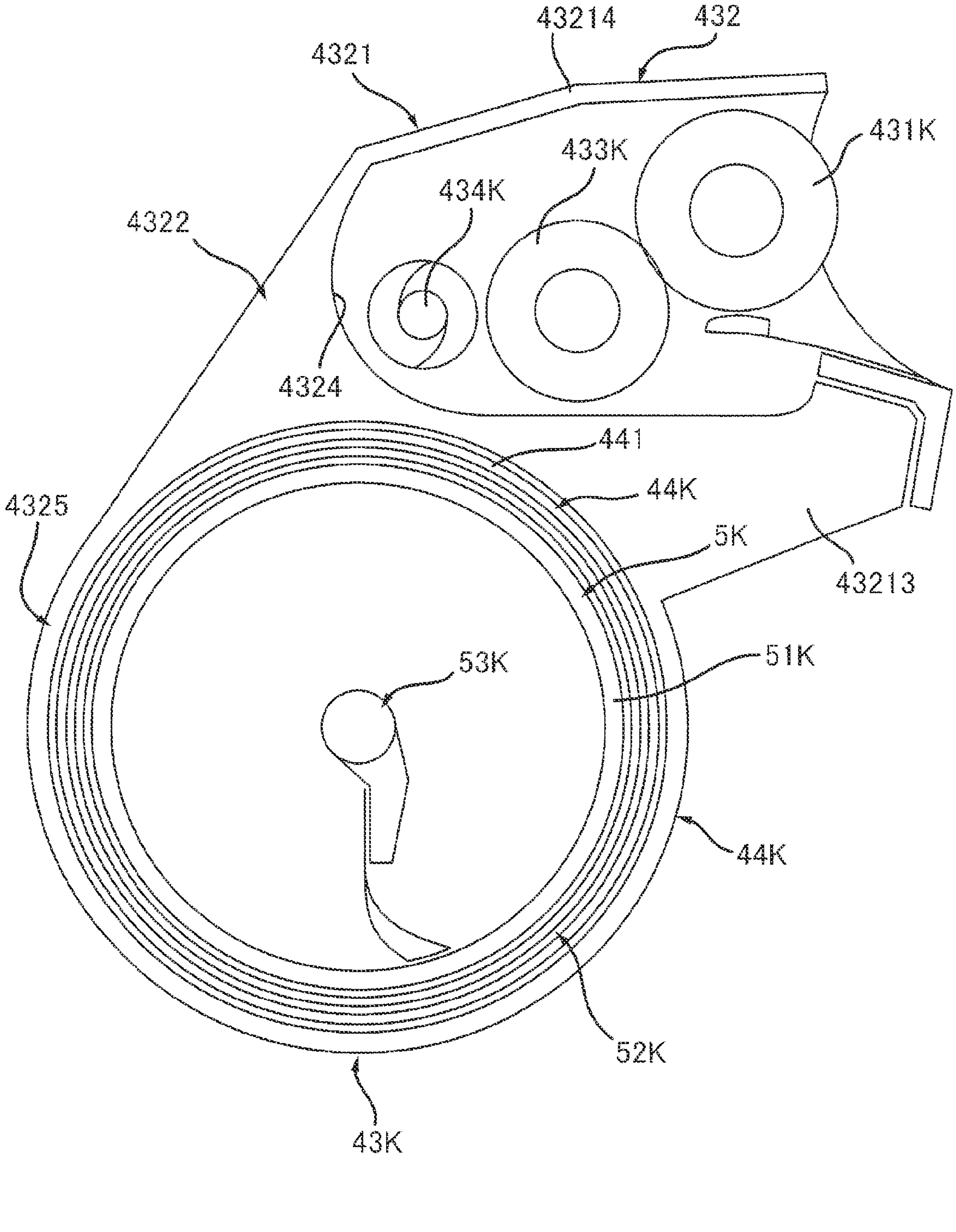
FIG. 7 is a B-B sectional view of the developing device shown in FIG. 6.

As shown in FIG. 7, the wall 4324 has a circular arc shape. In the state where the drum cartridge 4K is mounted to the main body housing 2, the wall 4324 has an upper end portion and a lower end portion in the vertical direction. In the state where the drum cartridge 4K is mounted to the main body housing 2, the upper end portion of the wall 4324 is connected to the upper wall 43214. In the state where the drum cartridge 4K is mounted to the main body housing 2, the lower end portion of the wall 4324 is connected to the bottom wall 43213.

Figure 8:
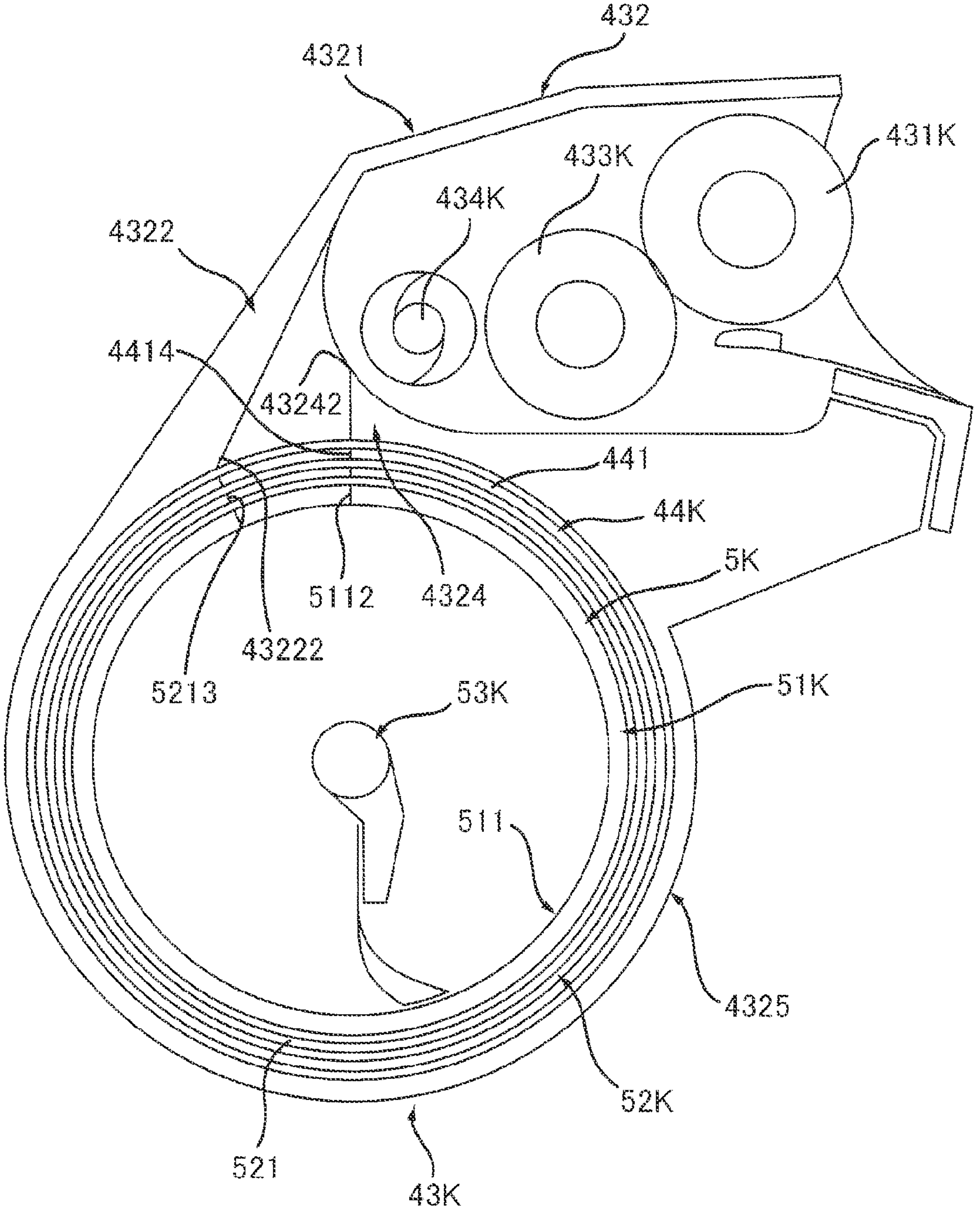
FIG. 8 is a C-C sectional view of the developing device shown in FIG. 6.

As shown in FIGS. 2 and 8, the wall 4324 has a first opening 43241 (see FIG. 2) and a second opening 43242 (see FIG. 8). In other words, the developing housing 432 has the first opening 43241 and the second opening 43242.

As shown in FIG. 2, the first opening 43241 communicates with the first developing part 4321. The first opening 43241 is located at a center of the wall 4324 in the first direction.

As shown in FIG. 8, the second opening 43242 communicates with the first developing part 4321. The second opening 43242 is located apart from the first opening 43241 in the first direction. The second opening 43242 is located between the first opening 43241 and the second sidewall 43212 in the first direction.

Although not shown, the wall 4324 further has a second opening 43243. The second opening 43243 is located on an opposite side to the second opening 43242 with respect to the first opening 43241 in the first direction. The second opening 43243 is located between the first opening 43241 and the first sidewall 43211 in the first direction.

As shown in FIG. 2, the second developing part 4322 is located on an opposite side to the photosensitive drum 41K with respect to the first developing part 4321. The second developing part 4322 is located on an opposite side to the first developing part 4321 with respect to the wall 4324. In other words, the wall 4324 is located between the first developing part 4321 and the second developing part 4322. The second developing part 4322 is connected to the wall 4324. In a state where the toner cartridge 5K is mounted to the main body housing 2, the second developing part 4322 is located above the cartridge mounting part 4325. In a state where the toner cartridge 5K is mounted to the drum cartridge 4K and the drum cartridge 4K is mounted to the main body housing 2, the second developing part 4322 is located above the toner cartridge 5K.

As shown in FIGS. 2 and 8, the second developing part 4322 has a toner acceptance port 43221 (see FIG. 2) and a toner returning port 43222 (see FIG. 8). In other words, the developing housing 432K has the toner acceptance port 43221 and the toner returning port 43222.

As shown in FIG. 2, the toner acceptance port 43221 is capable of accepting the toner that is supplied from the toner cartridge 5K. The toner acceptance port 43221 communicates with the first opening 43241. In other words, the first opening 43241 communicates with the toner acceptance port 43221 of the second developing part 4322. Thereby, the toner acceptance port 43221 of the second developing part 4322 communicates with the internal space of the first developing part 4321. The toner acceptance port 43221 is located at a center of the second developing part 4322 in the first direction.

As shown in FIG. 8, the toner returning port 43222 is capable of accepting the toner that is returned from the first developing part 4321 to the toner cartridge 5K. The toner returning port 43222 communicates with the second opening 43242. Thereby, the toner returning port 43222 communicates with the internal space of the first developing part 4321. The toner returning port 43222 is located apart from the toner acceptance port 43221 in the first direction. The toner returning port 43222 is located between the toner acceptance port 43221 and the second sidewall 43212 in the first direction.

Although not shown, the second developing part 4322 further has a toner returning port 43223. The toner returning port 43223 communicates with the second opening 43243. The toner returning port 43223 is located on an opposite side to the toner returning port 43222 with respect to the toner acceptance port 43221 in the first direction. The toner returning port 43223 is located between the toner acceptance port 43221 and the first sidewall 43211 in the first direction.

2.5.1.2 Cartridge Mounting Part 4325

As shown in FIG. 2, the toner cartridge 5K is capable of being mounted to the cartridge mounting part 4325. In the state where the drum cartridge 4K is mounted to the main body housing 2, the cartridge mounting part 4325 is located below the second developing part 4322. The cartridge mounting part 4325 is connected to the second developing part 4322, the wall 4324 and the bottom wall 43213. The cartridge mounting part 4325 has a cylindrical shape. The cartridge mounting part 4325 extends in the first direction. An internal space of the cartridge mounting part 4325 communicates with the toner acceptance port 43221 and the toner returning ports 43222 and 43223.

As shown in FIG. 6, the cartridge mounting part 4325 has a protruding portion 43251. The protruding portion 43251 protrudes toward an opposite side to the second sidewall 43212 with respect to the first sidewall 43211 in the first direction.

Figure 9:
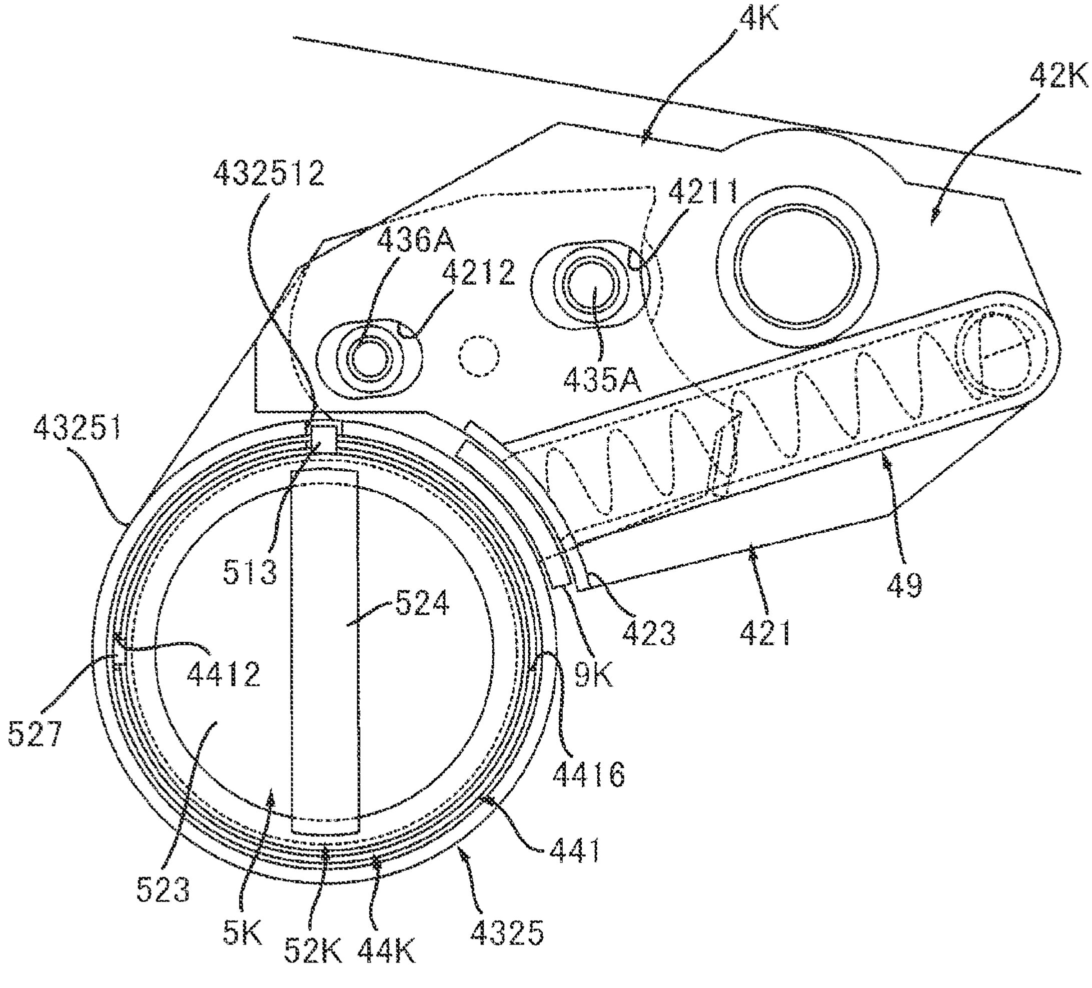
FIG. 9 is a side view of the drum cartridge shown in FIG. 1, showing the state where the toner cartridge is mounted to the drum cartridge, the developing shutter is located in the developing open position and the toner shutter is located in the toner open position.

As shown in FIGS. 5 and 9, the protruding portion 43251 faces the flange 423. The protruding portion 43251 has a waste toner discharge port 432511 (see FIG. 5) and a third hole 432512 (see FIG. 9). In other words, the cartridge mounting part 4325 of the drum cartridge 4K has the waste toner discharge port 432511 (see FIG. 5) and the third hole 432512 (see FIG. 9).

As shown in FIG. 5, the waste toner discharge port 432511 is capable of discharging the waste toner having passed through the waste toner tube 49K. The waste toner discharge port 432511 communicates with the hole 4231 of the flange 423. Thereby, the waste toner discharge port 432511 communicates with the internal space of the second end portion 492 of the waste toner tube 49K.

As shown in FIG. 9, in a state where the toner cartridge 5K is mounted to the cartridge mounting part 4325 of the drum cartridge 4K, a third protrusion 513 is fitted in the third hole 432512. When the toner cartridge 5K is mounted to the cartridge mounting part 4325 along the first direction, the third hole 432512 accepts the third protrusion 513. The third protrusion 513 will be described later.

The third hole 432512 is located on an opposite side to the first sidewall 43211 with respect to the waste toner discharge port 432511 in the first direction. In the present embodiment, the third hole 432512 is a groove that is concave in the first direction.

2.5.2 Supply Roller 433K

As shown in FIG. 2, the supply roller 433K is configured to supply the toner to the developing roller 431K. The supply roller 433K is arranged in the first developing part 4321. The supply roller 433K is located on an opposite side to the photosensitive drum 41K with respect to the developing roller 431K. The supply roller 433K extends in the first direction. The supply roller 433K is capable of rotating about an axis. The axis of the supply roller 433K extends in the first direction. One end portion of the supply roller 433K in the first direction is supported by the first sidewall 43211 (see FIG. 6). Another end portion of the supply roller 433K in the first direction is supported by the second sidewall 43212 (see FIG. 6).

2.5.3 Toner Conveying Member 434K

The toner conveying member 434K is arranged between the supply roller 433K and the wall 4324. The toner conveying member 434K is located on an opposite side to the photosensitive drum 41K with respect to the supply roller 433K. The toner conveying member 434K extends in the first direction. The toner conveying member 434K is capable of conveying the toner in the first direction. Thereby, the toner conveying member 434K is capable of conveying the toner supplied to the first developing part 4321 in the first direction, and supplying the toner to the supply roller 433K. For this reason, even when a size of at least one of the first opening 43241 and the toner acceptance port 43221 in the first direction is reduced, the toner can be appropriately supplied to the supply roller 433K. In addition, by reducing the size of the toner acceptance port 43221 in the first direction, leakage of the toner from the developing device 43K can be suppressed.

One end portion of the toner conveying member 434K in the first direction is supported by the first sidewall 43211 (see FIG. 6). Another end portion of the toner conveying member 434K in the first direction is supported by the second sidewall 43212 (see FIG. 6).

2.5.4 Developing Shutter 44K

Figure 3:
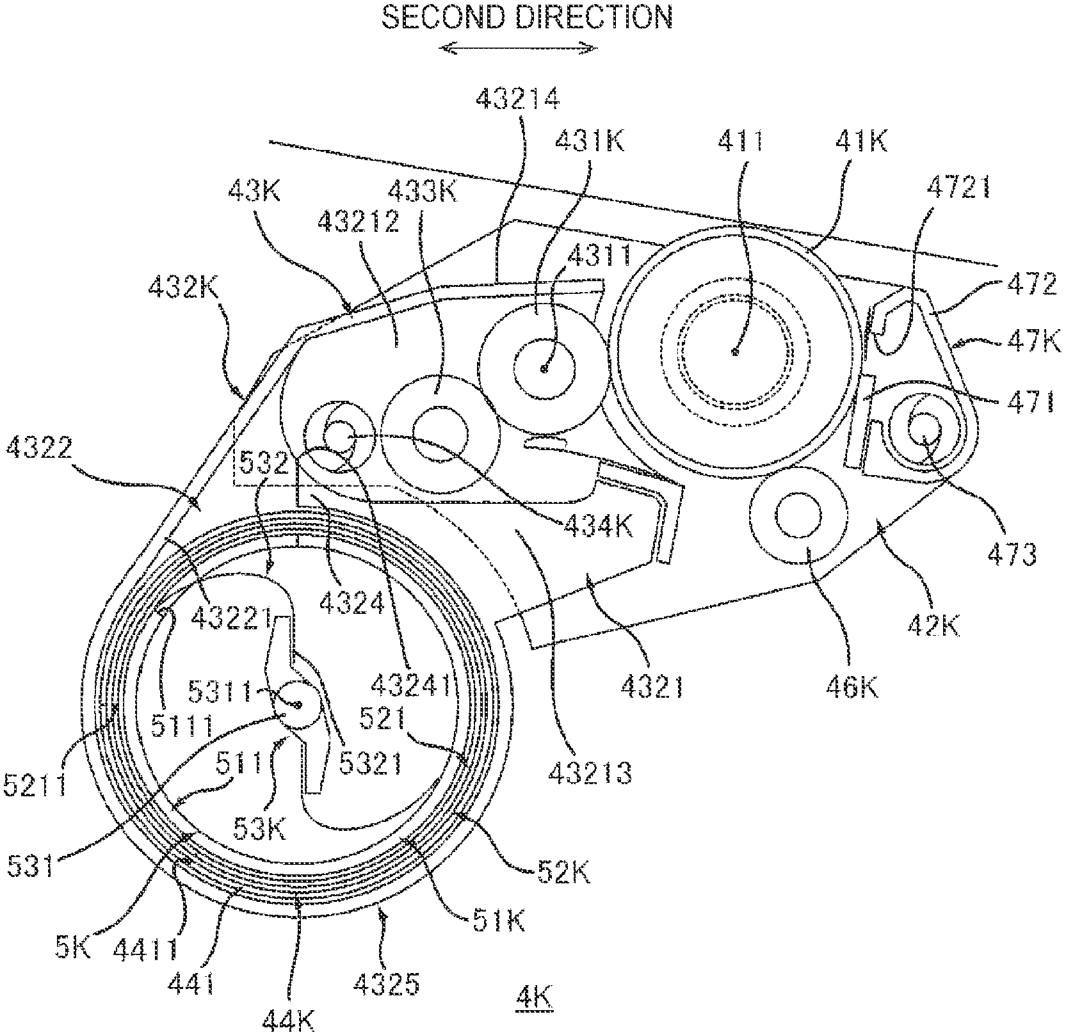
FIG. 3 is an enlarged view of the drum cartridge shown in FIG. 1, showing a state where the toner cartridge is mounted to the drum cartridge, the developing shutter is located in a developing close position and the toner shutter is located in a toner close position.
Figure 10:
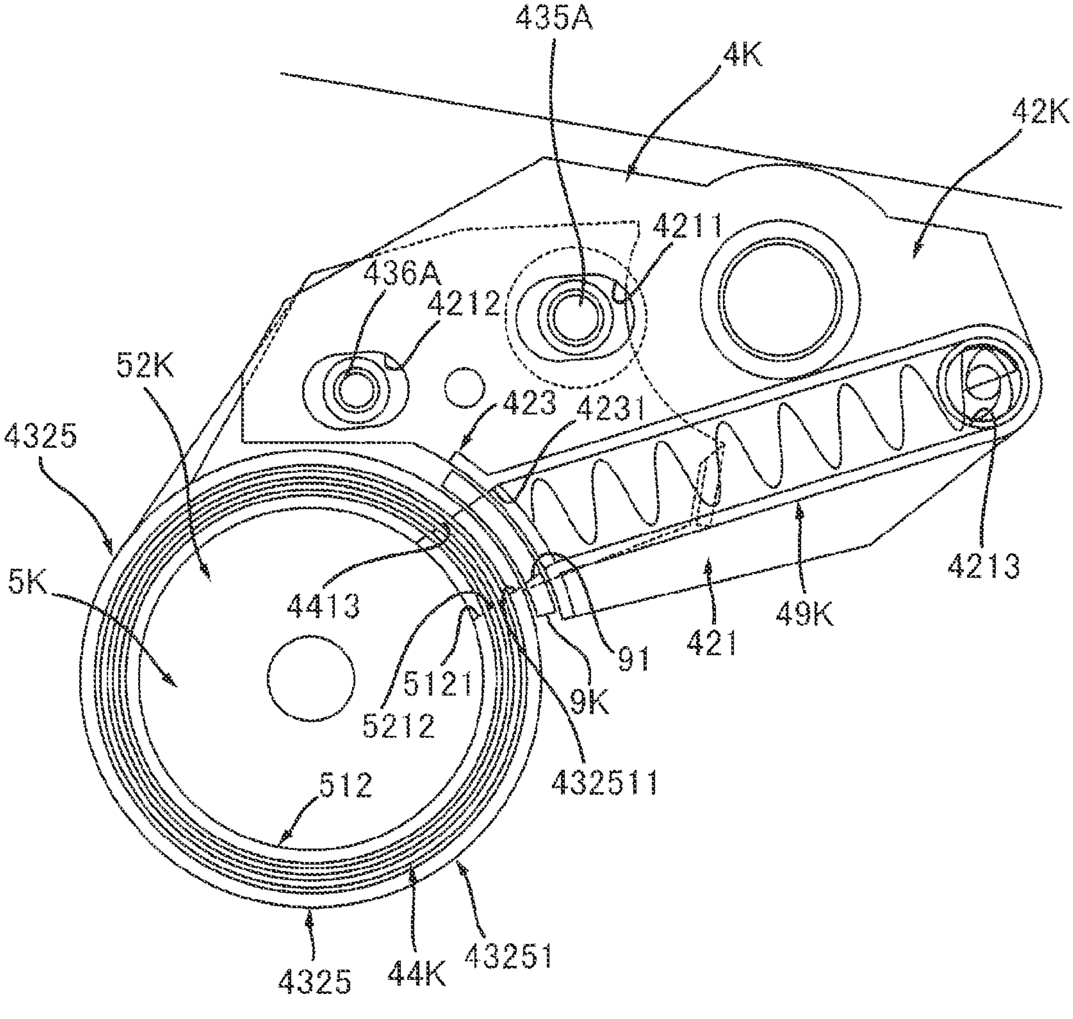
FIG. 10 is an A-A sectional view of the drum cartridge shown in FIG. 5, showing the state where the toner cartridge is mounted to the drum cartridge, the developing shutter is located in the developing open position and the toner shutter is located in the toner open position.

As shown in FIGS. 2 and 3, the developing shutter 44K is capable of moving between a developing open position (see FIG. 2) and a developing close position (see FIG. 3). As shown in FIGS. 2 and 10, in a state where the developing shutter 44K is located in the developing open position, the waste toner discharge port 432511 is opened and the toner acceptance port 43221 is opened. As shown in FIG. 8, in the state where the developing shutter 44K is located in the developing open position, the two toner returning ports 43222 and 42223 are opened.

Figure 11:
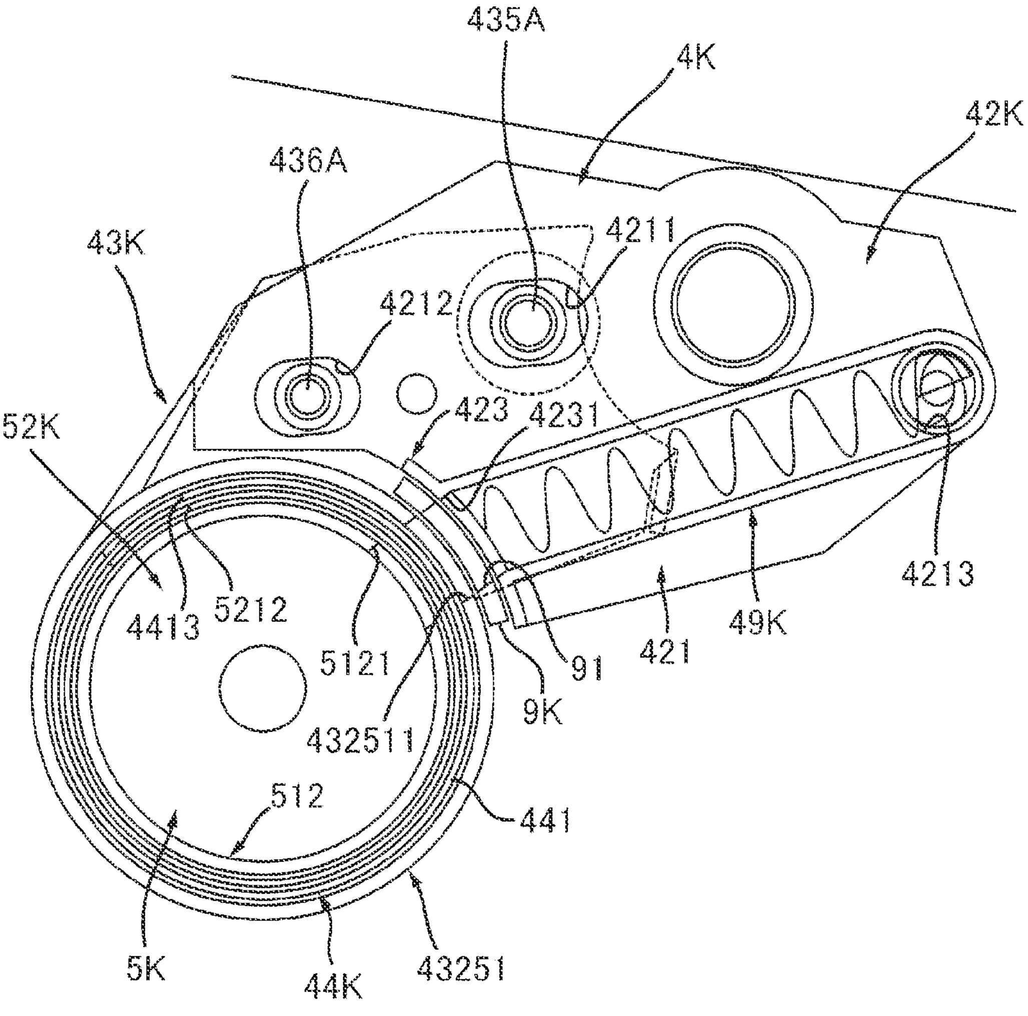
FIG. 11 is an A-A sectional view of the drum cartridge shown in FIG. 5, showing the state where the toner cartridge is mounted to the drum cartridge, the developing shutter is located in the developing close position and the toner shutter is located in the toner close position.

As shown in FIGS. 3 and 11, in a state where the developing shutter 44K is located in the developing close position, the developing shutter 44K closes the waste toner discharge port 432511 and the toner acceptance port 43221. Although not shown, in the state where the developing shutter 44K is located in the developing close position, the developing shutter 44K closes the two toner returning ports 43222 and 42223.

As shown in FIG. 5, the developing shutter 44K is arranged in the cartridge mounting part 4325. The developing shutter 44K includes a developing shutter body 441 and a sidewall 442.

2.5.4.1 Developing Shutter Body 441

The developing shutter body 441 extends in the first direction. The developing shutter body 441 has a cylindrical shape. For this reason, by rotating the developing shutter 44K, the developing shutter 44K can be moved between the developing open position and the developing close position. As a result, a space in which the developing shutter 44K moves can be reduced.

As shown in FIGS. 2, 5, 8 and 9, the developing shutter body 441 has a first shutter opening 4411 (see FIG. 2), a second shutter opening 4413 (see FIG. 5), a third shutter opening 4414 (see FIG. 8), a groove 4416 (see FIG. 9), and a second hole 4412 (see FIG. 9). In other words, the developing shutter 44K has the first shutter opening 4411, the second shutter opening 4413, the third shutter opening 4414, the groove 4416, and the second hole 4412.

As shown in FIGS. 2 and 3, the first shutter opening 4411 is located at a center of the developing shutter body 441 in the first direction. As shown in FIG. 2, in the state where the developing shutter 44K is located in the developing open position, at least a part of the first shutter opening 4411 communicates with the toner acceptance port 43221. As shown in FIG. 3, in the state where the developing shutter 44K is located in the developing close position, the first shutter opening 4411 is apart from the toner acceptance port 43221. In the state where the developing shutter 44K is located in the developing close position, the first shutter opening 4411 does not entirely communicate with the toner acceptance port 43221.

As shown in FIGS. 10 and 11, the second shutter opening 4413 is apart from the first shutter opening 4411 in the first direction. As shown in FIG. 10, in the state where the developing shutter 44K is located in the developing open position, at least a part of the second shutter opening 4413 communicates with the waste toner discharge port 432511. As shown in FIG. 11, in the state where the developing shutter 44K is located in the developing close position, the second shutter opening 4413 is apart from the waste toner discharge port 432511. In the state where the developing shutter 44K is located in the developing close position, the second shutter opening 4413 does not entirely communicate with the waste toner discharge port 432511.

As shown in FIG. 8, the third shutter opening 4414 is located on an opposite side to the second shutter opening 4413 with respect to the first shutter opening 4411 in the first direction. In the state where the developing shutter 44K is located in the developing open position, at least a part of the third shutter opening 4414 communicates with the toner returning port 43222. Although not shown, in the state where the developing shutter 44K is located in the developing close position, the third shutter opening 4414 is apart from the toner returning port 43222. In the state where the developing shutter 44K is located in the developing close position, the third shutter opening 4414 does not entirely communicate with the toner returning port 43222.

Note that, although not shown, the developing shutter 44K further has a third shutter opening 4415. The third shutter opening 4415 is located between the first shutter opening 4411 and the second shutter opening 4413 in the first direction. In the state where the developing shutter 44K is located in the developing open position, at least a part of the third shutter opening 4415 communicates with the toner returning port 43223. In the state where the developing shutter 44K is located in the developing close position, the third shutter opening 4415 does not communicate with the toner returning port 43223.

As shown in FIG. 9, in the state where the toner cartridge 5K is mounted to the cartridge mounting part 4325 of the drum cartridge 4K, the third protrusion 513 of the cartridge housing 51K is fitted in the groove 4416. When the toner cartridge 5K is mounted to the cartridge mounting part 4325 along the first direction, the groove 4416 accepts the third protrusion 513. The groove 4416 is located at one end of the developing shutter body 441 in the first direction. The groove 4416 is located on an opposite side to the first shutter opening 4411 with respect to the second shutter opening 4413 in the first direction. The groove 4416 is concave in the first direction. The groove 4416 extends in a circumferential direction of the developing shutter body 441.

In the state where the toner cartridge 5K is mounted to the cartridge mounting part 4325 of the drum cartridge 4K, a second protrusion 527 of the toner shutter 52K is fitted in the second hole 4412. When the toner cartridge 5K is mounted to the cartridge mounting part 4325 along the first direction, the second hole 4412 accepts the second protrusion 527. The second protrusion 527 will be described later. The second hole 4412 is located at one end of the developing shutter body 441 in the first direction. The second hole 4412 is apart from the groove 4416 in the circumferential direction of the developing shutter body 441. In the present embodiment, the second hole 4412 is a groove that is concave in the first direction.

2.5.4.2 Sidewall 442

As shown in FIG. 5, the sidewall 442 is located at another end of the developing shutter 44K in the first direction. The sidewall 442 closes the other end of the developing shutter 44K in the first direction. The sidewall 442 has two first holes 4421 and 4422. In other words, the developing shutter 44K has the two first holes 4421 and 4422. In the state where the toner cartridge 5K is mounted to the cartridge mounting part 4325 of the drum cartridge 4K, a first protrusion 525 is fitted in the first hole 4421. In the state where the toner cartridge 5K is mounted to the cartridge mounting part 4325, a first protrusion 526 is fitted in the first hole 4422. The first protrusions 525 and 526 will be described later.

2.5.4 First Developing Protrusions 435A and 435B

As shown in FIGS. 5 and 6, the first developing protrusion 435A is located on an opposite side to the second sidewall 43212 with respect to the first sidewall 43211 in the first direction. The first developing protrusion 435A extends in the first direction. The first developing protrusion 435A has a cylindrical shape. The first developing protrusion 435A may be a shaft of the developing roller 431K.

The first developing protrusion 435A is fitted in the first long hole 4211 of the first side frame 421. In a state where the first developing protrusion 435A is fitted in the first long hole 4211, the first long hole 4211 has an allowance in an extension direction of the first long hole 4211.

The first developing protrusion 435B is located on an opposite side to the first sidewall 43211 with respect to the second sidewall 43212 in the first direction. The first developing protrusion 435B is similar to the first developing protrusion 435A. Therefore, the description of the first developing protrusion 435B is omitted.

2.5.5 Second Developing Protrusions 436A and 436B

The second developing protrusion 436A is located on an opposite side to the second sidewall 43212 with respect to the first sidewall 43211 in the first direction. The second developing protrusion 436A extends in the first direction. The second developing protrusion 436A has a cylindrical shape. The second developing protrusion 436A may be a shaft of the toner conveying member 434K.

The second developing protrusion 436A is fitted in the second long hole 4212 of the first side frame 421. The second developing protrusion 436A is located on an opposite side to the photosensitive drum 41K with respect to the first developing protrusion 435A in the second direction. In a state where the second developing protrusion 436A is fitted in the second long hole 4212, the second long hole 4212 has an allowance in an extension direction of the second long hole 4212.

The second developing protrusion 436B is located on an opposite side to the first sidewall 43211 with respect to the second sidewall 43212 in the first direction. The second developing protrusion 436B is similar to the second developing protrusion 436A. Therefore, the description of the second developing protrusion 436B is omitted.

Thereby, the developing device 43K is supported by the first side frame 421 and the second side frame 422. The developing device 43K is capable of moving with respect to the photosensitive drum 41K in a direction intersecting with the first direction. Specifically, the developing device 43K is capable of moving with respect to the photosensitive drum 41K in a direction in which the developing roller 431K and the photosensitive drum 41K face each other.

2.6 Cushion Member 9K

As shown in FIG. 5, the cushion member 9K is located between the flange 423 of the drum frame 42K and the protruding portion 43251 of the cartridge mounting part 4325. In a case where the developing device 43K moves with respect to the photosensitive drum 41K in a state where the drum cartridge 4K is mounted in the main body housing 2, the cushion member 9K allows the cartridge mounting part 4325 to move with respect to the flange 423.

The cushion member 9K is formed of an elastic material. In the present embodiment, the cushion member 9K is formed of sponge. The cushion member 9K is located between the flange 423 and the protruding portion 43251 in a slightly compressed state. The cushion member 9K may also be bonded to the flange 423 and the protruding portion 43251 by a double-faced tape or the like.

In a case where the developing device 43K moves with respect to the photosensitive drum 41K in the state where the drum cartridge 4K is mounted in the main body housing 2, the cushion member 9K is elastically deformed.

Specifically, in a case where the developing device 43K moves away from the photosensitive drum 41K, the protruding portion 43251 moves away from the flange 423. Then, the cushion member 9K is restored from the compressed state, thereby filling a space between the protruding portion 43251 and the flange 423.

When the developing device 43K moves toward the photosensitive drum 41K, the protruding portion 43251 moves toward the flange 423. Then, the cushion member 9K is compressed between the protruding portion 43251 and the flange 423.

The cushion member 9K surrounds the waste toner discharge port 432511. The cushion member 9K has an opening 91. The opening 91 allows the waste toner having passed through the waste toner tube 49K to pass therethrough. The opening 91 communicates with the hole 4231 of the flange 423 and the waste toner discharge port 432511. The cushion member 9K that surrounds the waste toner discharge port 432511 is brought into contact with the flange 423 and the protruding portion 43251, so that the cushion member 9K seals between the flange 423 and the protruding portion 43251. In this way, leakage of the toner from a space between the flange 423 and the protruding portion 43251 can be suppressed.

3. Details of Toner Cartridge 5K

As shown in FIG. 2, the toner cartridge 5K is capable of being mounted to and demounted from the cartridge mounting part 4325 of the drum cartridge 4 in the first direction. The toner cartridge 5K is capable of accommodating the toner that is supplied to the developing housing 432K. In the state where the toner cartridge 5K is mounted to the developing device 43K, the toner cartridge 5K is capable of supplying the toner to the developing housing 432K of the developing device 43K. In a state where the drum cartridge 4K is mounted to the main body housing 2 and the toner cartridge 5K is mounted to the cartridge mounting part 4325, the toner cartridge 5K is located below the photosensitive drum 41K.

Figure 12:
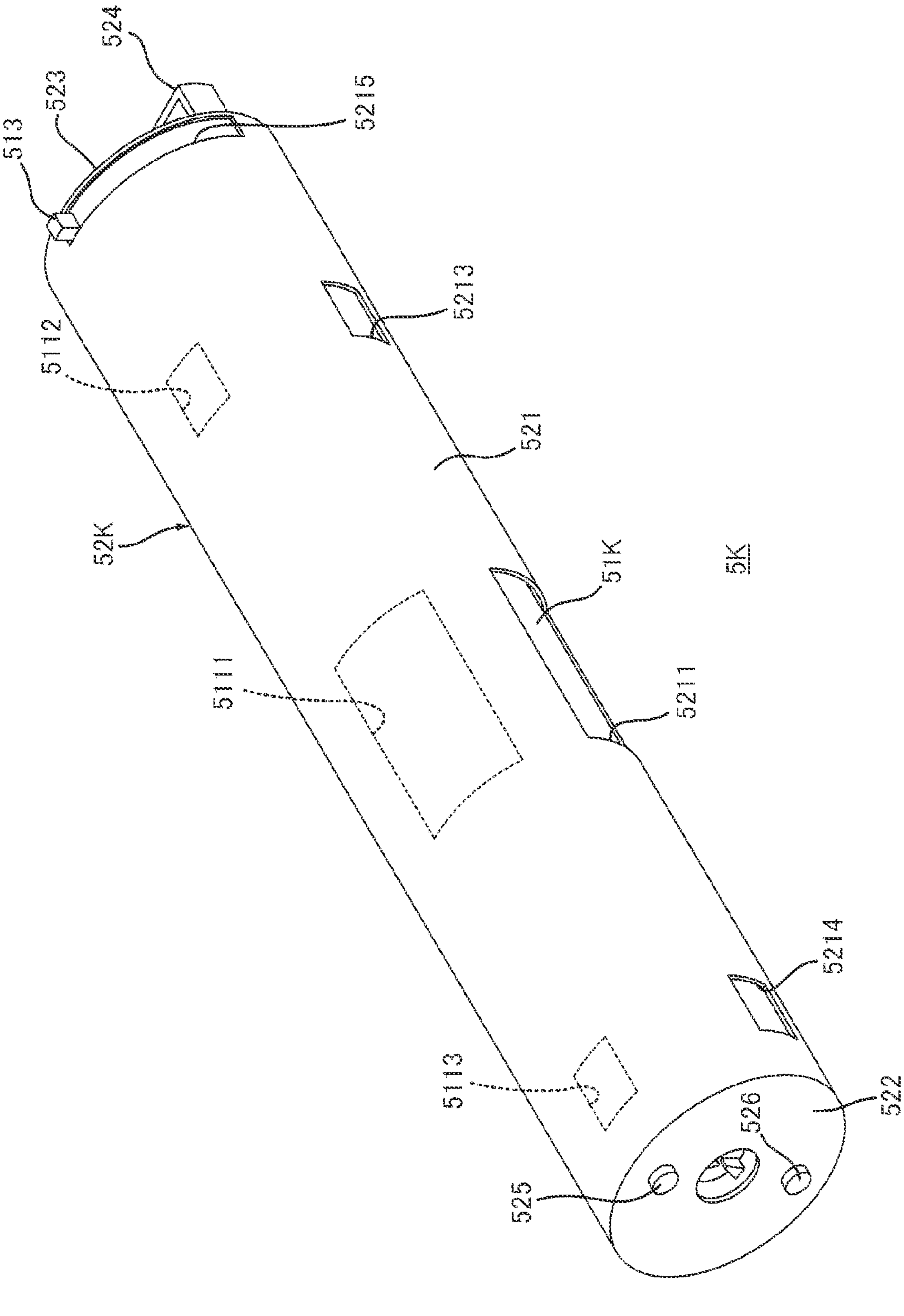
FIG. 12 is a perspective view of the toner cartridge shown in FIG. 2.
Figure 13:
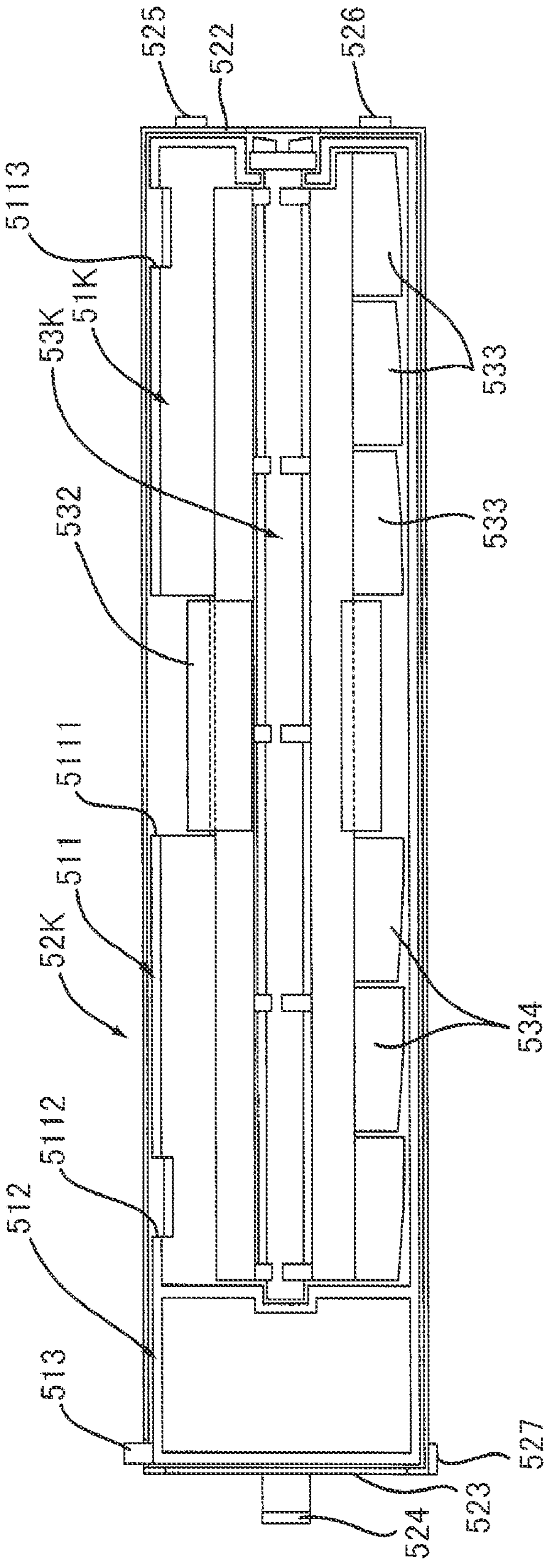
FIG. 13 is a schematic configuration view of the toner cartridge shown in FIG. 12.

As shown in FIG. 12, the toner cartridge 5K includes a cartridge housing 51K, a toner shutter 52K, and an agitator 53K (see FIG. 13).

3.1 Cartridge Housing 51K

The cartridge housing 51K is capable of accommodating the toner. Specifically, as shown in FIG. 13, the cartridge housing 51K can separately accommodate the toner and the waste toner. The cartridge housing 51K includes a toner accommodation part 511, a waste toner accommodation part

512, and the third protrusion 513. In other words, the toner cartridge 5K includes the toner accommodation part 511 and the waste toner accommodation part 512. The toner accommodation part 511 and the waste toner accommodation part 512 are arranged side by side in the first direction. The cartridge housing 51K has a cylindrical shape extending in the first direction.

3.1.1 Toner Accommodation Part 511

The toner accommodation part 511 is configured to accommodate the toner that is supplied to the first developing part 4321. The toner accommodation part 511 extends in the first direction. The toner accommodation part 511 has a toner discharge port 5111, and two toner receiving ports 5112 and 5113. In other words, the cartridge housing 51K has the toner discharge port 5111, and the two toner receiving ports 5112 and 5113.

In the state where the toner cartridge 5K is mounted to the cartridge mounting part 4325, the toner discharge port 5111 allows the toner accommodated in the toner accommodation part 511 to pass therethrough. The toner discharge port 5111 is located on a circumferential surface of the cartridge housing 51K. The toner discharge port 5111 is located at a center of the toner accommodation part 511 in the first direction. In the state where the toner cartridge 5K is mounted to the cartridge mounting part 4325, the toner discharge port 5111 is opened upward.

In the state where the toner cartridge 5K is mounted to the cartridge mounting part 4325, the toner receiving ports 5112 and 5113 accept the toner that is returned from the first developing part 4321. The two toner receiving ports 5112 and 5113 are located on the circumferential surface of the cartridge housing 51K. The toner receiving port 5112 is located apart from the toner discharge port 5111 in the first direction. The toner receiving port 5112 is located between the toner discharge port 5111 and the waste toner accommodation part 512 in the first direction. The toner receiving port 5113 is located on an opposite side to the toner receiving port 5112 with respect to the toner discharge port 5111 in the first direction. In the state where the toner cartridge 5K is mounted to the cartridge mounting part 4325, the two toner receiving ports 5112 and 5113 are opened upward.

3.1.2 Waste Toner Accommodation Part 512

The waste toner accommodation part 512 is configured to accommodate the toner conveyed from the waste toner tube 49K. As shown in FIG. 10, the waste toner accommodation part 512 has a waste toner acceptance port 5121. In the state where the toner cartridge 5K is mounted to the cartridge mounting part 4325, the waste toner acceptance port 5121 allows the waste toner from the waste toner tube 49K to pass therethrough. In the state where the toner cartridge 5K is mounted to the cartridge mounting part 4325, the waste toner acceptance port 5121 communicates with the waste toner discharge port 432511. The waste toner acceptance port 5121 is located on the circumferential surface of the cartridge housing 51K. In the state where the toner cartridge 5K is mounted to the cartridge mounting part 4325, the waste toner acceptance port 5121 is opened obliquely upward.

3.1.3 Third Protrusion 513

As shown in FIG. 9, in the state where the toner cartridge 5K is mounted to the cartridge mounting part 4325, the third protrusion 513 is fitted in a third hole 432512 of the protruding portion 43251. Thereby, in the state where the toner cartridge 5K is mounted to the cartridge mounting part 4325, the cartridge housing 51K is fixed to the cartridge mounting part 4325 of the drum cartridge 4K. The description "the cartridge housing 51K is fixed to the cartridge mounting part 4325" indicates a state where even when the toner shutter 52K moves in the circumferential direction of the cartridge housing 51K with respect to the cartridge mounting part 4325, the cartridge housing 51K does not move in the circumferential direction of the cartridge housing 51K with respect to the cartridge mounting part 4325. For this reason, in the state where the toner cartridge 5K is mounted to the cartridge mounting part 4325, the toner shutter 52K can be stably moved with respect to the cartridge housing 51K.

As shown in FIG. 12, the third protrusion 513 is located on a circumferential surface of the waste toner accommodation part 512. In other words, the waste toner accommodation part 512 has the third protrusion 513. The third protrusion 513 protrudes from the circumferential surface of the waste toner accommodation part 512. The third protrusion 513 is located on an opposite side to the toner discharge port 5111 with respect to the waste toner acceptance port 5121 in the first direction (see FIGS. 4, 11 and 13).

3.2 Toner Shutter 52K

The toner shutter 52K can move between a toner open position (see FIG. 2) and a toner close position (see FIG. 3).

As shown in FIGS. 2 and 10, in a state where the toner shutter 52K is located in the toner open position, the waste toner acceptance port 5121 is opened and the toner discharge port 5111 is opened. In a state where the toner cartridge 5K is mounted to the cartridge mounting part 4325 of the drum cartridge 4K, the developing shutter 44K is located in the developing open position and the toner shutter 52K is located in the toner open position, the waste toner acceptance port 5121 communicates with the waste toner discharge port 432511, and the toner discharge port 5111 communicates with the toner acceptance port 43221.

As shown in FIG. 8, in the state where the toner cartridge 5K is mounted to the drum cartridge 4K, the developing shutter 44K is located in the developing open position, and the toner shutter 52K is located in the toner open position, the two toner receiving ports 5112 and 5113 are opened, the toner receiving port 5112 communicates with the toner returning port 43222, and the toner receiving port 5113 communicates with the toner returning port 43223. Thereby, in the state where the toner cartridge 5K is mounted to the drum cartridge 4K, the developing shutter 44K is located in the developing open position and the toner shutter 52K is located in the toner open position, the toner can move from the first developing part 4321 to the cartridge housing 51K through the second opening 43242, the toner returning port 43222 and the toner receiving port 5112. For this reason, the toner can be circulated between the first developing part 4321 and the cartridge housing 51K. As a result, it is possible to suppress an influence of deterioration in toner on the image formation.

As shown in FIGS. 3 and 11, in the state where the toner shutter 52K is located in the toner close position, the toner shutter 52 closes the waste toner acceptance port 5121 and the toner discharge port 5111. Thereby, in a state where the developing shutter 44K is located in the developing close position and the toner shutter 52K is located in the toner close position, when the toner cartridge 5K is demounted from the cartridge mounting part 4325, the leakage of the waste toner from the toner cartridge 5K and the drum cartridge 4K can be suppressed.

Further, although not shown, in the state where the toner shutter 52K is located in the toner close position, the toner shutter 52K closes the two toner receiving ports 5112 and 5113.

As shown in FIGS. 12 and 13, the toner shutter 52K includes a toner shutter body 521, a first sidewall 522, a second sidewall 523, two first protrusions 525 and 526, a second protrusion 527, and a handle 524.

3.2.1 Toner Shutter Body 521

The toner shutter body 521 extends in the first direction. The toner shutter body 521 has a cylindrical shape. The cartridge housing 51K is located in the toner shutter body 521. For this reason, by rotating the toner shutter 52K, the toner shutter 52K can be smoothly moved between the toner open position and the toner close position along the cartridge housing 51K. As a result, a space in which the toner shutter 52K moves can be reduced.

The toner shutter body 521 has a first shutter opening 5211, a second shutter opening 5212, two third shutter openings 5213 and 5214, and a long hole 5215. In other words, the toner shutter 52K has the first shutter opening 5211, the second shutter opening 5212, the two third shutter openings 5213 and 5214, and the long hole 5215.

The first shutter opening 5211 is located at a center of the toner shutter body 521 in the first direction. As shown in FIG. 2, in the state where the toner shutter 52K is located in the toner open position, at least a part of the first shutter opening 5211 communicates with the toner discharge port 5111. In the state where the toner cartridge 5K is mounted to the cartridge mounting part 4325, the developing shutter 44K is located in the developing open position, and the toner shutter 52K is located in the toner open position, the toner discharge port 5111, the first shutter opening 5211 of the toner shutter 52K, the first shutter opening 4411 of the developing shutter 44K, and the toner acceptance port 43221 communicate with each other. As shown in FIG. 3, in the state where the toner shutter 52K is located in the toner close position, the first shutter opening 5211 is apart from the toner discharge port 5111. In the state where the toner shutter 52K is located in the toner close position, the first shutter opening 5211 does not entirely communicate with the toner discharge port 5111.

As shown in FIG. 10, the second shutter opening 5212 is apart from the first shutter opening 5211 in the first direction. In the state where the toner shutter 52K is located in the toner open position, at least a part of the second shutter opening 5212 communicates with the waste toner acceptance port 5121. In the state where the toner cartridge 5K is mounted to the cartridge mounting part 4325, the developing shutter 44K is located in the developing open position, and the toner shutter 52K is located in the toner open position, the waste toner acceptance port 5121, the second shutter opening 5212 of the toner shutter 52K, the second shutter opening 4413 of the developing shutter 44K, the waste toner discharge port 432511, the opening 91 of the cushion member 9, and the hole 4231 of the flange 423 communicate with each other.

As shown in FIG. 11, in the state where the toner shutter 52K is located in the toner close position, the second shutter opening 5212 is apart from the waste toner acceptance port 5121. In the state where the toner shutter 52K is located in the toner close position, the second shutter opening 5212 does not entirely communicate with the waste toner acceptance port 5121.

As shown in FIG. 12, the third shutter opening 5213 is located between the first shutter opening 5211 and the second shutter opening 5212 in the first direction. As shown in FIG. 8, in the state where the toner shutter 52K is located in the toner open position, at least a part of the third shutter opening 5213 communicates with the toner receiving port 5112. In the state where the toner cartridge 5K is mounted to the cartridge mounting part 4325, the developing shutter 44K is located in the developing open position, and the toner shutter 52K is located in the toner open position, the toner receiving port 5112, the third shutter opening 5213 of the toner shutter 52K, the third shutter opening 4414 of the developing shutter 44K, and the toner returning port 43222 communicate with each other. Although not shown, in the state where the toner shutter 52K is located in the toner close position, the third shutter opening 5213 is apart from the toner receiving port 5112. In the state where the toner shutter 52K is located in the toner close position, the third shutter opening 5214 does not entirely communicate with the toner receiving port 5113.

As shown in FIG. 12, the third shutter opening 5214 is located on an opposite side to the third shutter opening 5213 with respect to the first shutter opening 5211 in the first direction. The third shutter opening 5214 is similar to the third shutter opening 5213. Therefore, the description of the third shutter opening 5214 is omitted.

The third protrusion 513 of the cartridge housing 51K is fitted in the long hole 5215. In a state where the third protrusion 513 is fitted in the long hole 5215, the third protrusion 513 protrudes from the toner shutter body 521. The long hole 5215 is located on an opposite side to the toner discharge port 5111 with respect to the third shutter opening 5213 in the first direction. The long hole 5215 extends in a circumferential direction of the toner shutter body 521.

Although not shown, the image forming apparatus 1 may have a seal member. In the state where the toner cartridge 5K is mounted to the drum cartridge 4K, the seal member seals between the developing shutter 44K and the toner shutter 52K. In the state where the toner cartridge 5K is mounted to the drum cartridge 4K, the seal member seals between the developing shutter body 441 and the toner shutter body 521. In the state where the toner cartridge 5K is mounted to the drum cartridge 4K, the developing shutter 44K is located in the developing open position and the toner shutter 52K is located in the toner open position, the seal member surrounds the first shutter opening 4411 and the first shutter opening 5211, surrounds the second shutter opening 4413 and the second shutter opening 5212, surrounds the third shutter opening 4414 and the third shutter opening 5213, and surrounds the third shutter opening 4415 and the third shutter opening 5214. The seal member may be one member or a plurality of members.

3.2.2 First Sidewall 522 and Second Sidewall 523

The first sidewall 522 closes the other end of the toner shutter body 521 in the first direction. The second sidewall 523 closes one end of the toner shutter body 521 in the first direction.

3.2.3 First Protrusions 525 and 526

The two first protrusions 525 and 526 are located at the other end of the toner shutter 52K in the first direction. The two first protrusions 525 and 526 are located on an opposite side to the waste toner acceptance port 5121 with respect to the toner discharge port 5111 in the first direction. The two first protrusions 525 and 526 are provided on the first sidewall 522. The two first protrusions 525 and 526 are located on an opposite side to the second sidewall 523 with respect to the first sidewall 522 in the first direction. The two first protrusions 525 and 526 each extend in the first direction. The first protrusion 526 is located on an opposite side to the first protrusion 525 with respect to an axis of the toner shutter body 521.

In the state where the toner cartridge 5K is mounted to the cartridge mounting part 4325, the first protrusion 525 is fitted in the first hole 4421 (see FIG. 5). In the state where the toner cartridge 5K is mounted to the cartridge mounting part 4325, the first protrusion 526 is fitted in the first hole 4422 (see FIG. 5).

3.2.4 Second Protrusion 527

As shown in FIG. 13, the second protrusion 527 is located at one end of the toner shutter 52K in the first direction. The second protrusion 527 is located on an opposite side to the toner discharge port 5111 with respect to the waste toner acceptance port 5121 in the first direction (see FIGS. 4 and 10). The second protrusion 527 is provided to the toner shutter body 521. The second protrusion 527 protrudes from the toner shutter body 521. In the state where the toner shutter 52K is located in the toner close position, the second protrusion 527 is located on an opposite side to the third protrusion 513 with respect to the waste toner accommodation part 512.

As shown in FIG. 9, in the state where the toner cartridge 5K is mounted to the drum cartridge 4K, the second protrusion 527 is fitted in the second hole 4412.

Specifically, in the state where the toner cartridge 5K is mounted to the cartridge mounting part 4325, the first protrusion 525 is fitted in the first hole 4421, the first protrusion 526 is fitted in the first hole 4422, and the second protrusion 527 is fitted in the second hole 4412. Thereby, in the state where the toner cartridge 5K is mounted to the drum cartridge 4K, the developing shutter 44K can be moved together with the toner shutter 52K. Specifically, as shown in FIGS. 2 and 3, in the state where the toner cartridge 5K is mounted to the cartridge mounting part 4325, when the toner shutter 52K moves from the toner close position to the toner open position, the developing shutter 44K moves from the developing close position to the developing open position, in conjunction with the toner shutter 52K. Further, in the state where the toner cartridge 5K is mounted to the cartridge mounting part 4325, when the toner shutter 52K moves from the toner open position to the toner close position, the developing shutter 44K moves from the developing open position to the developing close position, in conjunction with the toner shutter 52K.

3.2.5 Handle 524

As shown in FIG. 13, the handle 524 is operated by a user. The user can move the toner shutter 52K between the toner close position and the toner open position with holding the handle 524. The handle 524 is located on an opposite side to the first sidewall 522 with respect to the second sidewall 523 in the first direction. The handle 524 is provided on the second sidewall 523.

3.3 Agitator 53K

As shown in FIG. 2, in the state where the toner cartridge 5K is mounted to the drum cartridge 4K, the agitator 53K is capable of conveying the toner in the toner accommodation part 511 toward the first developing part 4321. As shown in FIG. 13, the agitator 53K is located in the toner accommodation part 511 of the cartridge housing 51K. The agitator 53K is capable of rotating. The agitator 53K includes a shaft 531, a first blade 532, a plurality of second blades 533, and a plurality of third blades 534.

3.3.1 Shaft 531

The shaft 531 is rotatably supported by the toner accommodation part 511. The shaft 531 is capable of rotating about a rotational axis 5311 (see FIG. 2). The rotational axis 5311 extends in the first direction. The rotational axis 5311 of the shaft 531 coincides with an axis of the cartridge housing 51K. Thereby, in the state where the toner cartridge 5K is mounted to the drum cartridge 4K, the developing shutter 44K is located in the developing open position and the toner shutter 52K is located in the toner open position, when the agitator 53K rotates, the agitator 53K can smoothly convey the toner accommodated in the cartridge housing 51K toward the first developing part 4321.

3.3.2 First Blade 532

The first blade 532 is capable of rotating together with the shaft 531. The first blade 532 is supported at a central part of the shaft 531 in the first direction. The first blade 532 has flexibility. As shown in FIG. 2, the first blade 532 has a first end 5321 and a second end 5322. The first end 5321 of the first blade 532 is fixed to the shaft 531. The second end 5322 of the first blade 532 is located apart from the first end 5321.

In the state where the toner cartridge 5K is mounted to the drum cartridge 4K, the developing shutter 44 is located in the developing open position, and the toner shutter 52 is located in the toner open position, in a case where the agitator 53K rotates, the second end 5322 of the first blade 532 reaches a height of the first opening 43241 in the vertical direction. In the state where the toner cartridge 5K is mounted to the drum cartridge 4K, the developing shutter 44, is located in the developing open position and the toner shutter 52 is located in the toner open position, in a case where the agitator 53K rotates, the second end 5322 of the first blade 532 reaches a position higher than the bottom wall 43213 in the vertical direction. Further, the first blade 532 has a height overlapping the toner conveying member 434K in the vertical direction in the state where the second end 5322 reaches the height of the first opening 43241. Thereby, in the state where the toner cartridge 5K is mounted to the drum cartridge 4K, even when the cartridge housing 51K of the toner cartridge 5K is located below the second developing part 4322, the agitator 53K is capable of stably supplying the toner from the cartridge housing 51K to the first developing part 4321 through the second developing part 4322 and the first opening 43241.

Further, in the state where the second end 5322 reaches the height of the first opening 43241, a part of the first blade 532 between the first end 5321 and the second end 5322 passes through the toner discharge port 5111, the first shutter opening 5211 of the toner shutter 52K, the first shutter opening 4411 of the developing shutter 44K, and the toner acceptance port 43221.

In this state, in some cases, the rotation of the agitator 53K stops. When the toner shutter 52K moves from the toner open position to the toner close position, the toner shutter 52K moves in an opposite direction to a rotating direction of the agitator 53K. For this reason, in the state where the second end 5322 of the first blade 532 of the agitator 53K reaches the height of the first opening 43241 in the vertical direction, when the toner shutter 52K moves from the toner open position to the toner close position, the first blade 532 is pushed by the toner shutter 52K and is bent with moving in the toner discharge port 5111. For this reason, the first blade 532 can be suppressed from being caught between the toner shutter 52K and the cartridge housing 51K, so that the toner shutter 52 can be stably moved from the toner open position to the toner close position.

Further, when the developing shutter 44K moves from the developing open position to the developing close position, the developing shutter 44K moves in the opposite direction to the rotating direction of the agitator 53K. Thereby, the first blade 532 of the agitator 53K can be suppressed from being caught between the developing shutter 44K and the cartridge mounting part 4325, so that the developing shutter 44K can be stably moved from the developing open position to the developing close position.

3.3.3 Plurality of Second Blades 533

As shown in FIG. 13, the plurality of second blades 533 is located between the first blade 532 and the first sidewall 522 in the first direction. The plurality of second blades 533 is supported by the shaft 531. When the agitator 53K rotates, the plurality of second blades 533 stirs the toner in the toner accommodation part 511 and conveys the toner toward the first blade 532.

3.3.4 Plurality of Third Blades 534

The plurality of third blades 534 is located between the first blade 532 and the waste toner accommodation part 512 in the first direction. The plurality of third blades 534 is supported by the shaft 531. When the agitator 53K rotates, the plurality of third blades 534 stirs the toner in the toner accommodation part 511 and conveys the toner toward the first blade 532.

4. Operational Effects (1) As shown in FIG. 10, in the state where the toner cartridge 5K is mounted to the cartridge mounting part 4325 of the drum cartridge 4K, the waste toner removed from the circumferential surface of the photosensitive drum 41K by the drum cleaner 47K is accommodated in the waste toner accommodation part 512 of the toner cartridge 5K through the waste toner tube 49K and the waste toner acceptance port 5121. The waste toner accommodation part 512 is replaced together with the toner accommodation part 511 by replacement of the toner cartridge 5K. For this reason, the waste toner accommodation part 512 can stably accommodate the waste toner without increasing the capacity thereof.

Further, the cushion member 9K is located between the flange 423 to which the second end portion 492 of the waste toner tube 49K is connected and the protruding portion 43251 of the cartridge mounting part 4325.

For this reason, in the state where the toner cartridge 5K is mounted to the cartridge mounting part 4325 and the drum cartridge 4K is mounted to the main body housing 2, in a case where the developing device 43K moves with respect to the photosensitive drum 41K, the cartridge mounting part 4325 is capable of moving with respect to the flange 423, and the leakage of the waste toner from between the flange 423 and the protruding portion 43251 can be suppressed.

(2) As shown in FIG. 2, in the state where the toner cartridge 5K is mounted to the drum cartridge 4K, the developing shutter 44K is located in the developing open position, and the toner shutter 52K is located in the toner open position, in a case where the agitator 53K rotates, the second end 5322 of the first blade 532 reaches the height of the first opening 43241 in the vertical direction.

For this reason, in the state where the toner cartridge 5K is mounted to the drum cartridge 4K, even when the cartridge housing 51K of the toner cartridge 5K is located below the second developing part 4322, the agitator 53K can stably supply the toner from the cartridge housing 51K to the first developing part 4321 through the second developing part 4322 and the first opening 43241.

Further, as shown in FIG. 3, in the state where the developing shutter 44K is located in the developing close position, the developing shutter 44K closes the toner acceptance port 43221 of the second developing part 4322. In the state where the toner shutter 52K is located in the toner close position, the toner shutter 52K closes the toner discharge port 5111 of the cartridge housing 51K.

For this reason, in the state where the developing shutter 44K is located in the developing close position and the toner shutter 52K is located in the toner close position, when the toner cartridge 5K is demounted from the drum cartridge 4K, the toner can be suppressed from leaking from the toner cartridge 5K and the drum cartridge 4K.

As a result, the drum cartridge 4K and the toner cartridge 5K can be replaced individually and smoothly.

What is claimed is:

1. An image forming apparatus comprising:
a main body housing;
a drum cartridge capable of being mounted to the main body housing, the drum cartridge including:
a photosensitive drum rotatable about an axis extending in a first direction; and
a developing device including a developing roller and a developing housing supporting the developing roller;
a toner cartridge capable of accommodating toner that is supplied to the developing housing, the toner cartridge including:
a cartridge housing capable of accommodating the toner, the cartridge housing having a toner discharge port; and
a transfer device located above the photosensitive drum in a state where the drum cartridge is mounted to the main body housing, and configured to transfer the toner on the photosensitive drum to a sheet,
wherein the drum cartridge has a toner cartridge mounting part to which the toner cartridge is capable of being mounted,
wherein the developing device includes a toner conveying member capable of conveying the toner in the first direction, and
wherein when the drum cartridge is mounted to the main body housing and the toner cartridge is mounted to the toner cartridge mounting part, the toner conveying member is located above the toner cartridge, and offset from the toner discharge port when viewed from a vertical direction that is perpendicular to the first direction.

2. The image forming apparatus according to claim 1,
wherein when the drum cartridge is mounted to the main body housing and the toner cartridge is mounted to the toner cartridge mounting part, the toner discharge port is located on an upper surface of the toner cartridge.

3. The image forming apparatus according to claim 2,
wherein the developing device includes a supply roller configured to supply the toner to the developing roller,
wherein the developing housing includes a toner acceptance port capable of accepting the toner that is supplied from the toner cartridge, and
wherein the toner acceptance port is located on an opposite side to the developing roller with respect to the supply roller.

4. The image forming apparatus according to claim 3,
wherein when the drum cartridge is mounted to the main body housing and the toner cartridge is mounted to the toner cartridge mounting part, the shaft overlaps with the toner acceptance port in a second direction intersecting with the first direction.

5. The image forming apparatus according to claim 3,
wherein the toner conveying member is located between the toner acceptance port and the supply roller in a second direction intersecting with the first direction.

6. The image forming apparatus according to claim 3,
wherein the toner cartridge includes:
a rotatable agitator located in the cartridge housing, the agitator including:
a shaft; and
a blade rotatable together with the shaft, and wherein when the drum cartridge is mounted to the main body housing and the toner cartridge is mounted to the toner cartridge mounting part, the shaft is located on an opposite side to the photosensitive drum with respect to the supply roller in a second direction intersecting with the first direction.

7. The image forming apparatus according to claim 6, wherein the toner cartridge includes:

a toner shutter configured to be movable between a toner close position in which the toner discharge port is closed and a toner open position in which the toner discharge port is opened, and wherein when the toner shutter moves from the toner open position to the toner close position, the toner shutter moves in an opposite direction to a rotating direction of the agitator.

8. The image forming apparatus according to claim 7, wherein the developing device further includes:

a developing shutter configured to be movable between a developing close position in which the toner acceptance port is closed and a developing open position in which the toner acceptance port is opened, and wherein when the developing shutter moves from the developing open position to the developing close position, the developing shutter moves in an opposite direction to a rotating direction of the agitator.

9. The image forming apparatus according to claim 6, wherein the cartridge housing has a cylindrical shape extending in the first direction, and wherein a rotational axis of the shaft coincides with an axis of the cartridge housing.

10. The image forming apparatus according to claim 6, wherein the blade having a first end fixed to the shaft and a second end located apart from the first end, wherein in a state where the toner cartridge is mounted to the drum cartridge, the toner discharge port communicates with the toner acceptance port, and wherein in the state where the toner cartridge is mounted to the drum cartridge, in a case where the agitator rotates, the second end of the blade is capable of protruding from the toner discharge port.

11. The image forming apparatus according to claim 6, wherein the shaft is capable of rotating about a rotational axis, and wherein the toner conveying member is located between the rotational axis and the supply roller in the second direction.

12. The image forming apparatus according to claim 11, wherein the cartridge housing has a cylindrical shape extending in the first direction, and wherein the rotational axis of the shaft coincides with an axis of the cartridge housing.

* * * * *